United States Patent [19]

Yazawa et al.

[11] Patent Number: 5,612,926

[45] Date of Patent: Mar. 18, 1997

[54] SEQUENTIAL ACCESS MEMORY

[75] Inventors: Minobu Yazawa; Shiro Hosotani, both of Hyogo, Japan

[73] Assignee: Mitsubishi Denki Kabushiki Kaisha, Tokyo, Japan

[21] Appl. No.: 529,065

[22] Filed: Sep. 15, 1995

[30] Foreign Application Priority Data

Nov. 30, 1994 [JP] Japan .................................. 6-296509

[51] Int. Cl.$^6$ ..................................................... G11C 8/00
[52] U.S. Cl. ............................ 365/239; 365/240; 365/233
[58] Field of Search ..................................... 365/239, 240, 365/189.04, 233

[56] References Cited

U.S. PATENT DOCUMENTS

| | | | |
|---|---|---|---|
| 4,961,169 | 10/1990 | Matsumura et al. | 365/189.12 |
| 5,345,419 | 9/1994 | Fenstermaker et al. | 365/189.04 |
| 5,444,660 | 8/1995 | Yamanaka et al. | 365/189.12 |

FOREIGN PATENT DOCUMENTS

| | | |
|---|---|---|
| 63-175953 | 7/1988 | Japan . |
| 5244452 | 9/1993 | Japan . |
| 5328294 | 12/1993 | Japan . |

Primary Examiner—David C. Nelms
Assistant Examiner—Trong Phan
Attorney, Agent, or Firm—Oblon, Spivak, McClelland, Maier & Neustadt, P.C.

[57] ABSTRACT

In an FIFO memory, a word line pointer (4) sequentially specifies word lines (8) in accordance with the first clock signal (CLK1) outputted from a clock generator (3). When the last pointer (5) outputs a last line access signal (PAS3) indicating that the last word line (8E) has been accessed, a control flag generator (2) detects that the last address has been accessed on the basis of the last line access signal (PAS3) and a clock signal (COS) in synchronization with the first clock (CLK1) and outputs a clock control signal (CCNT) in accordance with a timing of the detection. The clock generator 3 stops counting a reference clock signal (CLK0) in response to the clock control signal (CCNT). Thus, the access to a memory cell array of the FIFO memory is stopped in accordance with the number of effective pixels of inputted video signals, and thereby reduction in memory capacity and in power consumption can be achieved.

17 Claims, 18 Drawing Sheets

SEQUENTIAL ACCESS MEMORY

BACKGROUND OF THE INVENTION

1. Field of the Invention

The present invention relates to access techniques for a sequential access memory or an FIFO memory.

2. Description of the Background Art

One of the background arts, which is disclosed in Japanese Patent Laid-Open Gazette 52-154311, is an FIFO queue control system having a storage region of ring configuration in which a ring counter of N cycle is used as write pointer and read pointer.

Another background art, which is disclosed in Japanese Patent Laid-Open Gazettes 63-27055 and 61-139990, is a word line selection system using a shift register.

Both of the above background arts, however, disclose only a word line selection which is achieved by using a shift register or a counter.

As a method to control the practical amount of memory of the FIFO memory in accordance with input, a FULL-flag control circuit and an EMPTY-flag control circuit are used in the above configuration. For example, in a single scanning period (1H Line) of 480 words, the setting of a FULL-flag at the 384-word point is detected. In this method, there arises some problems: When an address pointer using a shift register is employed, it is necessary to provide a comparator circuit to make a comparison every line between a word line for reading and a word line for writing. When a memory address counter is employed to make access to a DRAM, it is necessary to additionally provide two counters for reading and for writing to specify a location of the word line and a comparator circuit to compare the two counters. For these reasons, it is not desirable to use such circuits because of an increase in circuit scale.

SUMMARY OF THE INVENTION

The present invention is directed to a sequential access memory. According to the first aspect of the present invention, the sequential access memory comprises: a memory cell array which data signals are written to and read from; addressing means for receiving a reset signal which is externally given, to make access to word lines and bit lines of the memory cell array in accordance with a reference clock signal which is externally given; and control means for detecting that a predetermined address of a predetermined word line has been specified on the basis of at least one output from the addressing means to stop an operation of the addressing means in accordance with the detection result. In the sequential access memory, the predetermined address of the predetermined word line is determined in accordance with the number of effective data of the inputted data signals.

According to the second aspect of the present invention, in the sequential access memory of the first aspect, the addressing means comprises a clock generator for outputting a clock signal for word line and a clock signal for bit line in accordance with the reference clock signal after being reset by receiving the reset signal; an input/output circuit for controlling the writing and reading of the data signals to and from the memory cell array through the bit lines in response to the clock signal for bit line; and a word line pointer having a shift register for sequentially specifying each location of the word lines in response to the clock signal for word line, the control means comprises detection means for detecting a timing of writing or reading the data signals to or from the predetermined address of the predetermined word line on the basis of at least one output from the word line pointer; and clock control signal generating means for outputting a clock control signal which gives a command to stop an operation of the clock generator to the clock generator in accordance with the detection result of the detection means, and the clock generator stops its operation of outputting the clock signal for word line and the clock signal for bit line in response to the clock control signal.

According to the third aspect of the present invention, in the sequential access memory of the second aspect, the predetermined address of the predetermined word line is a last address of a last word line, and the detection means comprises last address access signal generating means for detecting a timing of writing or reading the data signals to or from the last address of the last word line on the basis of an output from the word line pointer which specifies the last word line, and for outputting the detection result as a last address access signal.

According to the fourth aspect of the present invention, in the sequential access memory of the third aspect, the clock control signal generating means outputs the clock control signal in response to the last address access signal.

According to the fifth aspect of the present invention, in the sequential access memory of the third aspect, the clock generator comprises a counter for counting the reference clock signal in response to the reset signal; and another clock generator for outputting the clock signal for word line and the clock signal for bit line in accordance with the number of counts outputted from the counter, and the last address access signal generating means comprises an AND circuit for obtaining a logical product of a carry-out signal outputted from the counter and an output from the word line pointer which specifies the last word line, and for outputting an AND signal which indicate the logical product as the last address access signal, and the clock control signal generating means is a count enable function portion of the counter, which is operable to stop a count operation of the counter in response to the last address access signal.

According to the sixth aspect of the present invention, in the sequential access memory of the third aspect, the clock control signal generating means comprises a counter for counting the last address access signal to give a command indicating that the count result reaches a predetermined number to be counted; and a control flag generator for outputting the clock control signal in response to the command, and the predetermined number to be counted is determined in accordance with the number of effective data of the data signals.

According to the seventh aspect of the present invention, in the sequential access memory of the fifth aspect, the clock control signal generating means further comprises a selector for selecting a preset load signal which gives the predetermined number to be counted from a plurality of preset load signals each of which gives the number to be counted corresponding to the number of effective data of the data signals, and for outputting the preset load signal which is selected to a preset load terminal of the counter, the counter selects one of a plurality of preset signals which are applied to preset terminals thereof in accordance with the preset load signal received by the preset load terminal, and each of the plurality of preset signals which correspond to the plurality of preset load signals, respectively, gives the corresponding number of effective data of the data signals.

According to the eighth aspect of the present invention, in the sequential access memory of the sixth aspect, the memory cell array comprises n (n≧2) another memory cell arrays serially connected to each other with the word lines in common, each of the n another memory cell arrays having a memory capacity of which the amount is given by dividing the maximum number of effective data of the data signals by n, for sequentially transmitting the data signals to the next one of the another memory cell arrays; and a selector for receiving a plurality of outputs corresponding to the possible numbers of effective data of the data signals among outputs of the n another memory cell arrays, and for selecting one of the plurality of received outputs, which corresponds to the number of effective data of the data signals actually received, to output the selected one.

According to the ninth aspect of the present invention, in the sequential access memory of the second aspect, the detection means comprises a selector for receiving a plurality of outputs from the word line pointer, and for selecting one of the plurality of received outputs, which indicates the predetermined word line specified by a mode signal to be inputted, to output the selected one; and predetermined address access signal generating means for detecting that the predetermined address of the predetermined word line has been accessed on the basis of the output of the selector to output a predetermined address access signal, and the clock control signal generating means outputs the clock control signal in response to the predetermined address access signal.

According to the tenth aspect of the present invention, in the sequential access memory of the ninth aspect, the clock generator comprises a counter for counting the reference clock signal in response to the reset signal; and an another clock generator for outputting the clock signal for word line and the clock signal for bit line in accordance with the number of counts outputted from the counter, the clock control signal generating means is a count enable function portion of the counter, which is operable to stop a count operation of the counter in response to the predetermined address access signal, and the predetermined address access signal generating means outputs the predetermined address access signal in accordance with the carry-out signal outputted from the counter and the output of the selector.

According to the eleventh aspect of the present invention, in the sequential access memory of the first aspect, the addressing means is an address counter for counting the reference clock signal and specifying addresses of the memory cell array in accordance with the count result, and the address counter stops its count operation in response to an output of the control means and remains in a stopped state until the reset signal is applied thereto.

According to the twelfth aspect of the present invention, in the sequential access memory of the eleventh aspect, the predetermined address of the predetermined word line is a last address value of a last word line, and the control means is a carry-out signal output function portion provided in the address counter, which is operable to output a carry-out signal as the detection result when the count result of the address counter indicates the last address value of the memory cell array.

According to the thirteenth aspect of the present invention, in the sequential access memory of the eleventh aspect, the control means outputs a signal to give an operation-stop command to a count enable terminal of the address counter when the count result of the address counter is equal to the number to be counted which corresponds to the predetermined address of the predetermined word line.

According to the fourteenth aspect of the present invention, a sequential access memory comprises: a memory cell array which data signals are written to and read from; a counter for counting a reference clock signal which is externally given in response to a reset signal to generate the number of counts and a first clock signal; a clock control gate connected to a count output terminal of the counter, for receiving a first output signal to control outputting the number of counts from the counter in accordance with a level of the first output signal; a clock generator for receiving the number of counts of the counter outputted from the clock control gate, and for generating a clock signal to specify bit lines of the memory cell array; a word line pointer for sequentially specifying word lines of the memory cell array in accordance with the first clock signal; a word line control gate connected between the word line pointer and the memory cell array, for controlling inputting an output of the word line pointer to the memory cell array in accordance with the level of the first output signal; and first and second output signal generating means for detecting a first timing at which a last address of a last word line is specified by receiving a last line access signal which indicates that the word line pointer has specified the last word line to thereby output a signal which changes from a first level into a second level to the clock control gate and the word line control gate as the first output signal at the first timing, and for detecting a second timing at which the last address of a predetermined word line is specified by receiving a predetermined line access signal which indicates that the word line pointer has specified the predetermined word line after specifying the last word line to thereby output the first output signal which changes from the second level into the first level to the clock control gate and the word line control gate at the second timing, while outputting a second output signal which changes in level at the second timing to the counter as the reset signal.

According to the fifteenth aspect of the present invention, in the sequential access memory of the fourteenth aspect, the counter comprises a first selector for changing a preset value in response to the level change of the first output signal; and a preset counter for receiving the preset value outputted from the first selector as an initial value, to count the reference clock signal, and for outputting the number of counts and the first clock signal. The preset counter is reset in response to the reset signal which is received by a clear terminal thereof.

According to the sixteenth aspect of the present invention, in the sequential access memory of the fifteenth aspect, the preset counter comprises a carry-out terminal for outputting a carry-out signal, and the first and second output signal generating means comprises AND circuit means for detecting the first timing by obtaining a logical product of the carry-out signal and the last line access signal outputted from the word line pointer, while detecting the second timing by obtaining a logical product of the carry-out signal and the predetermined line access signal; a second selector for selecting an output signal of the AND circuit means in response to the level change of the first output signal; first output signal generating means, of which an output end is connected to the first selector, the second selector, the word line control gate and the clock control gate, for outputting the first output signal which changes from the first level into the second level when an output of the second selector indicates that the first timing has been detected, and for outputting the first output signal which changes from the second level into the first level when the output from the second selector indicates that the second timing has been detected; and second output signal generating means, of which an input end is connected to the output of the second selector and an output of the first output signal generating means, for outputting the level change of the second output signal on the basis of the output from the second selector indicating that the second timing has been detected and the first output signal which changes from the second level into the first level.

According to the seventeenth aspect of the present invention, in the sequential access memory of the sixteenth aspect, the first output signal generating means comprises a status latch for outputting the second level as the first output signal when the output of the second selector indicates that the first timing has been detected, while outputting the first level as the first output signal when the output of the second selector indicates that the second timing has been detected.

In the sequential access memory in accordance with the first aspect of the present invention, when the addressing means specifies the predetermined address of the predetermined word line, the control means, detecting the specification of the predetermined address, stops the operation of the addressing means.

Thus, the access to the memory cell array can be stopped at the predetermined location of the predetermined word line specified by the addressing means, and accordingly, the sequential access memory stores only the data signals equivalent in number to the effective data. Therefore, the memory of the memory cell array only to store the number of effective data is required, and reduction in memory, and moreover, in power consumption can be achieved.

In the sequential access memory in accordance with the second aspect of the present invention, when the word line pointer specifies the predetermined word line, the detection means detects that the predetermined address of the predetermined word line has been accessed by receiving the output which indicates the specification of the predetermined word line. Based on the detection, the clock control signal generating means outputs the clock control signal to the clock generator thereby stopping the operation of the clock generator.

Thus, it becomes possible to stop the access to the memory cell array of the sequential access memory at the point in time when the data signals equivalent in number to the effective data of the inputted data signals have been written to or read from the memory cell array, and accordingly, reduction in memory and in power consumption can be achieved.

In the sequential access memory in accordance with the third aspect of the present invention, the word line pointer gives an output to the last address access signal generating means when it specifies the last word line. Receiving the output from the word line pointer, the last address access signal generating means detects that the last address of the last word line has been accessed and outputs the detection result as the last address access signal. Based on the last address access signal, the clock control signal generating means stops the operation of the clock generator.

The access to the memory cell array is stopped at the point in time when the last address of the last word line in the memory cell array is accessed, and accordingly, only the data signals equivalent in number to the effective data are written to or read from the memory cell array. Therefore, reduction in memory and in power consumption can be achieved.

In the sequential access memory in accordance with the fourth aspect of the present invention, said clock control signal generating means outputs said clock control signal in accordance with said last address access signal.

Thus, the sequential access memory stores only the data signals equivalent in number to the effective data, thereby achieving reduction in memory and in power consumption.

In the sequential access memory in accordance with the sixth aspect of the present invention, the counter outputs the command to the control flag generator after counting the last address access signal to the predetermined number to be counted, and consequently, the control flag generator stops the operation of the clock generator in accordance with the command. Thus, after the predetermined number of accesses to the memory cell array in accordance with the predetermined number to be counted, the access operation is stopped.

Since the access to the sequential access memory is stopped at the point in time when the predetermined number of sequential accesses to the sequential access memory have been continuously performed, as a result, the same effect is produced as in the case where only the data signals equivalent in number to the effective data are written to and read from the sequential access memory. That makes a contribution to reduction in memory of the memory cell array and in area of the device.

In the sequential access memory in accordance with the seventh aspect of the present invention, the selector selects a preset load signal which gives the predetermined number to be counted from a plurality of preset load signals and outputs the selected preset load signal to the preset load terminal. Receiving the preset load signal, the counter selects a preset signal corresponding to the predetermined number to be counted given by the preset load signal and performs a count operation. Therefore, the counter enables only a predetermined number of accesses to the memory cell array in accordance with the number of effective data of the inputted data signals.

Thus, when the present invention is applied to a system in which the number of effective data varies depending on the inputted data signals, it is possible to desirably write and read only the data signals equivalent in number to the effective data of the actually inputted data signals to and from the sequential access memory. Moreover, since there is no need to store the data signals equivalent in number to the ineffective data in the sequential access memory, power consumption can be optimized in accordance with the actually inputted data signals.

In the sequential access memory in accordance with the eighth aspect of the present invention, the data signals of which the number is given by (the maximum number of effective data of the data signals)÷(n) are written to or read from one of another memory cell arrays. The data signals read from one of another memory cell arrays are written to the next one of another memory cell arrays. The selector receives a plurality of outputs corresponding to the possible numbers of effective data of the data signals among outputs of each of n another memory cell arrays, and selects an output corresponding to the number of effective data of the actually received data signals from the plurality of received outputs.

Thus, when the present invention is applied to a system in which the number of effective data varies depending on the inputted data signals, it is possible to selectively output an appropriate number of data signals equivalent to the effective data. The amount of memory in each of another memory cell arrays can be therefore reduced. Since the number of arrays in another memory cell arrays is determined in accordance with the maximum number of effective data, it is possible to achieve reduction in power consumption when the inputted data signals have the maximum number of the effective data.

In the sequential access memory in accordance with the ninth aspect of the present invention, the operation of the clock generator is stopped in response to the predetermined address access signal which is detected and generated by the selector and the predetermined address access signal generating means. Therefore, access is made to up to the one of memory cells, which corresponds to the predetermined word line, in the memory cell array.

Thus, when the present invention is applied to a system in which a wide variety of numbers of effective data may be stored in the sequential access memory, it is possible to desirably store the data signals equivalent in number to the effective data of the actually inputted data signals in the sequential access memory. Therefore, optimization of operation time and reduction in power consumption can be achieved.

In the sequential access memory in accordance with the tenth aspect of the present invention, the predetermined address access signal generating means outputs the predetermined address access signal to the count enable function portion of the counter in accordance with the carry-out signal and the output from the selector, and the counter, receiving the predetermined address access signal, stops its operation.

Thus, by utilizing the function of the counter, it becomes possible to implement multiword sequential access memory function, to achieve reduction in memory and in power consumption, and moreover, to ensure design simplicity.

In the sequential access memory in accordance with the eleventh aspect of the present invention, the address counter counts the reference clock signal to specify addresses of the memory cell array in accordance with the count result and outputs the count result to the control means. Receiving the count result, the control means gives an output which serves as an operation-stop command to the address counter. The address counter thereby stops its count operation and remains in a stopped state until a next reset signal is applied thereto.

Also in a case where the address counter is used for access to the sequential access memory, it is possible, by utilizing the output of the address counter, to store only the data signals equivalent in number to the effective data in the sequential access memory, and to achieve reduction in power consumption and in memory.

In the sequential access memory in accordance with the twelfth aspect of the present invention, the carry-out signal output function portion provided in the address counter performs a function as the control means.

Thus, by utilizing the function of the address counter itself, it is also possible to store only the data signals equivalent in number to the effective data in the sequential access memory, and to achieve reduction in power consumption and in memory.

In the sequential access memory in accordance with the thirteenth aspect of the present invention, the control means gives an operation-stop command to the count enable terminal of the address counter when the count result of the address counter indicates the predetermined address of the predetermined word line, and the address counter, receiving the command, stops its count operation.

Thus, by utilizing the counter value of the address counter, it is possible to implement multiword sequential access memory function and to achieve reduction in power consumption.

In the sequential access memory in accordance with the fourteenth aspect of the present invention, the first output signal outputted from the first and second output signal generating means changes in level at the first timing, and in response to the level change, the access to the memory cell array is stopped. After that, at the second timing, the first output signal changes in level again and the second output signal is generated and outputted as the reset signal, and thereby the access to the memory cell array is restarted.

Thus, the clock count operation is performed while the access to the memory cell is in a stopped state, to thereby internally generate a reset signal. As a result, by elimination of the need to externally receive the reset signal, the sequential access memory in accordance with the fourteenth aspect ensures reduction in area of the device and improvement in design efficiency, as well as the effects of storing only the data signals equivalent in number to the effective data in the sequential access memory and of achieving reduction in power consumption and in memory.

A primary object of the present invention is to store only the data signals equivalent in number to the effective data into the memory cell array and to stop the operation of the FIFO memory (or the sequential access memory) during a blanking period (a period for inputting ineffective data), without causing an increase in circuit scale. A secondary object is to achieve reduction in memory capacity of the memory cell array and in power consumption, to implement a multiword FIFO memory, to ensure design simplicity and to eliminate the need to receive an external reset signal.

These and other objects, features, aspects and advantages of the present invention will become more apparent from the following detailed description of the present invention when taken in conjunction with the accompanying drawings.

DESCRIPTION OF THE PREFERRED EMBODIMENTS

A sequential access memory, which the present invention is directed to, is also referred to as an FIFO memory. The term "FIFO memory" will be used for discussion hereinafter.

<The First Preferred Embodiment>

The feature of the first preferred embodiment lies in provision of a control flag signal generating circuit (hereinafter referred to as "CFG", abbreviation of control flag generator) which receives an output from a word line pointer indicating the last line of a memory cell array. The CFG has a function of generating a signal to stop an operation of a clock generator circuit (hereinafter referred to as "CG", being abbreviated) which controls the writing/reading of data to/from the memory cell array. Discussion will be presented below referring to FIG. 1 which is a block diagram functionally showing a configuration in accordance with the first preferred embodiment.

Figure 1:
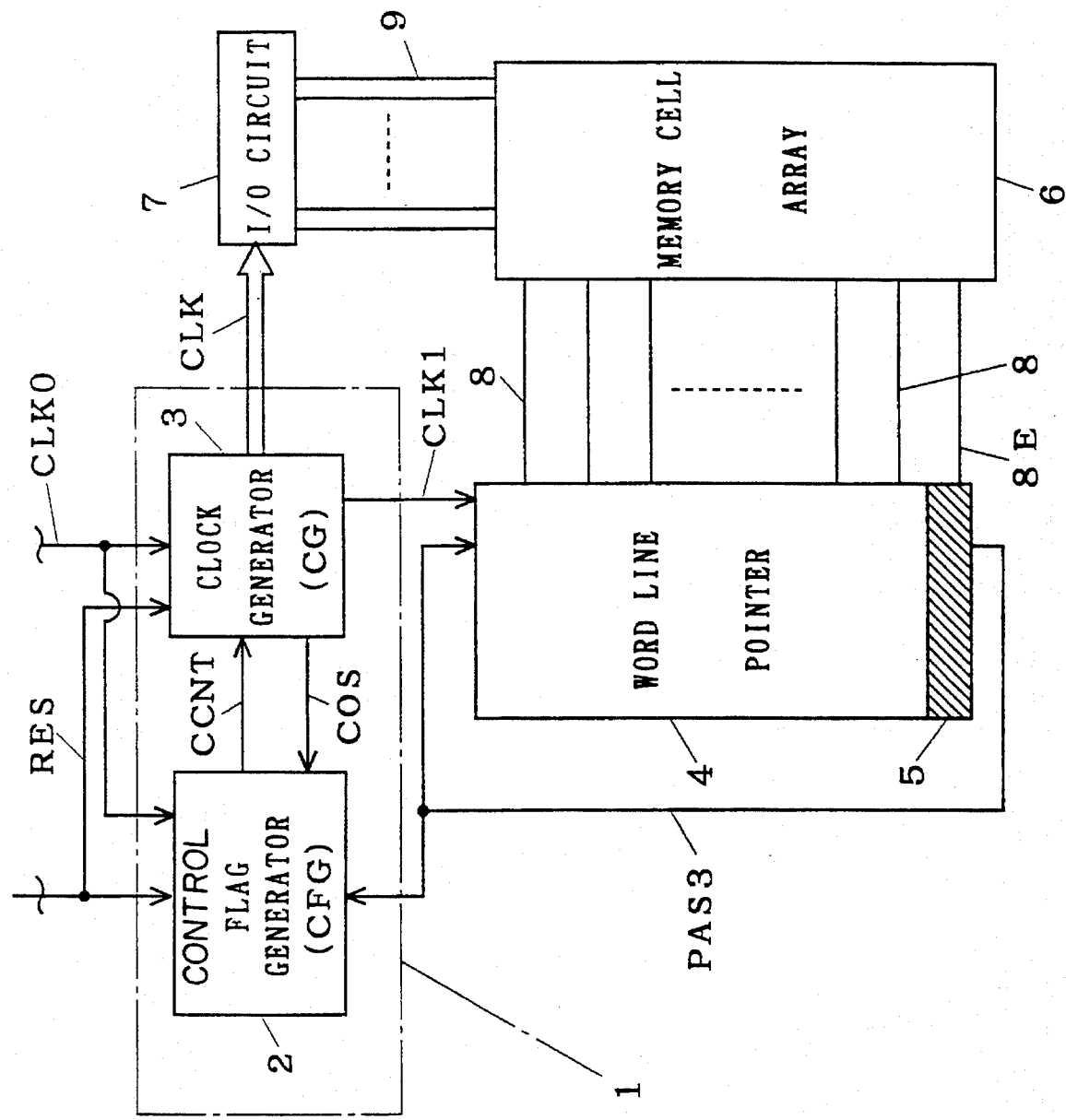
FIG. 1 is a block diagram functionally showing a configuration in accordance with a first preferred embodiment of the present invention.

In FIG. 1, a memory cell array 6 and an I/O circuit (input/output circuit) 7 constitute an FIFO (First In First Out) memory. Furthermore, a system of FIG. 1 on the whole is also referred to as an FIFO memory in the first preferred embodiment. The same applies to all of the preferred embodiments discussed later.

A clock generator (CG) 3 is reset by receiving a reset signal RES which is externally given. After that, the CG 3 counts a reference clock CLK0 which is also externally given, to generate a clock signal CLK and a first clock signal CLK1. The CG 3 outputs the clock signal CLK (a clock signal for bit lines) to the I/O circuit 7 thus controlling it. In response to the clock signal CLK, data input and output is performed with the bit lines 9 of the memory cell array 6 through the I/O circuit 7. The CG 3 further outputs the first clock signal CLK1 (a clock signal for word lines) to a word line pointer 4 thus controlling it. The word line pointer 4 sequentially specifies the word lines 8 of the memory cell array 6 in synchronization with the first clock signal CLK1.

The word line pointer 4, which is configured by using a shift register, outputs a last line access signal PAS3 to indicate that access has been made to the last line when the last pointer 5 of the word line pointer 4 specifies the last line of the memory cell array 6, i.e., the last word line 8E. Specifically, when a signal of level "1" is set on the last word line 8E, the word line pointer 4 outputs the signal to a control flag generator (CFG) 2 as the last line access signal PAS3. The last line access signal PAS3 remains in a state of level "1" while effective pixels are being written to or being read from memory cells in the last line of the memory cell array 6.

After that, the word line pointer 4 is reset by receiving the first clock signal CLK1 outputted from the CG 3 in response to the input of the next reset signal RES. Furthermore, instead of the first clock signal CLK1, the reset signal RES may be directly applied to the word line pointer 4 to reset it.

Figure 2:
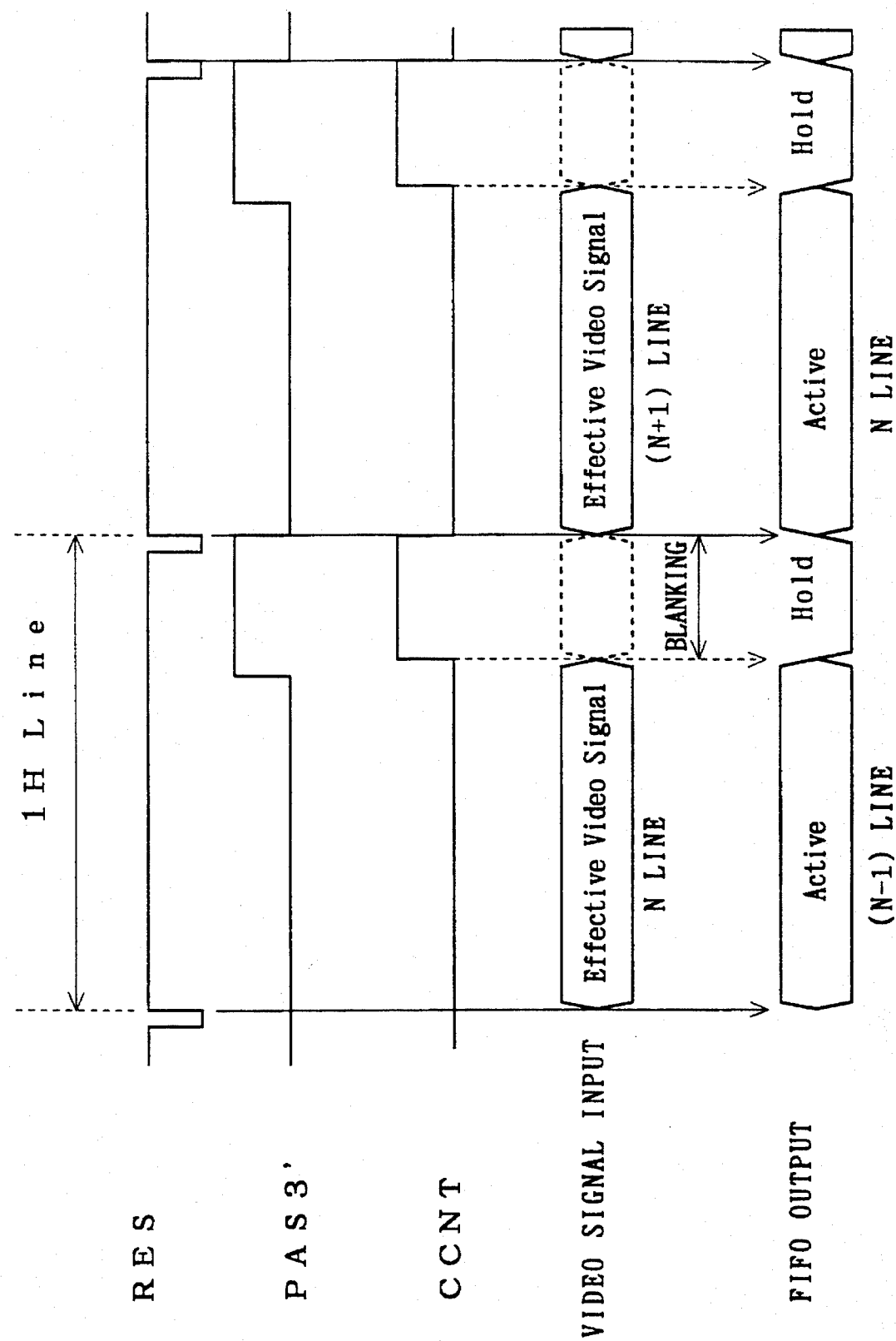
FIG. 2 is a timing chart illustrating an operation in accordance with the first preferred embodiment of the present invention.

Referring to the timing chart of FIG. 2, the operation in accordance with the first preferred embodiment will be discussed.

The CFG 2 and the CG 3 forming circuit 1 are reset in response to the external reset signal RES, and consequently the memory cell array 6 is reset. Then, the operation (writing/reading) of the FIFO memory starts. When the last pointer 5 goes into an active state, the last line access signal PAS3 is generated. Receiving the last line access signal PAS3, the CFG 2 generates a last address access signal PAS3' (detection result) shown in FIG. 2 on the basis of a clock signal COS in synchronization with the first clock signal CLK1 and the last line access signal PAS3. The detection result PAS3' is a clock to give a timing of addressing the last memory cell of the last line in the memory cell array 6 and writing or reading data to or from the last memory cell. The CFG 2 further generates a clock control signal CCNT on the basis of the last address access signal PAS3' and the reference clock CLK0. The clock control signal CCNT is a signal, being delayed for one cycle of the reference clock CLK0 with respect to the last address access signal PAS3', to stop the operation of the CG 3. Receiving the clock control signal CCNT, the CG 3 stops outputting the clock signal CLK and the first clock signal CLK1 to the I/O circuit 7 and the word line pointer 4, respectively. In consequence, the access to the memory cell array 6 and increment of the word line pointer 4 are stopped. After that, the CFG 2 and the CG 3 are reset when the reset signal RES is externally applied thereto again, restarting the writing/reading of video signals.

Thus, in the configuration example shown in FIG. 1, the CG 3, the I/O circuit 7 and the word line pointer 4 correspond to "the addressing means", and the CFG 2 corresponds to "the control means". Furthermore, "the predetermined address of the predetermined word line" is the last address of the last word line. In the first preferred embodiment, the last address of the last word line 8E in the memory cell array 4 is determined in accordance with the number of effective pixels of the inputted video signals.

<Effect>

Use of the access technique as above in the first preferred embodiment allows reduction in memory capacity of the memory cell and in power consumption substantially for a single scanning delay. Specifically, the writing/reading of video signals starts in response to the reset signal RES called a horizontal synchronous signal which is generated in each scanning, and the writing of video signals to the FIFO memory is stopped by the function of the CFG 2 after the effective video signals have been all written thereto. The read operation starts at a timing of receiving the next horizontal synchronous signal (RES), thus ensuring a predetermined delay (see FIG. 2).

As to video signals, the International Standard determines the number of the video signals in a single scanning period (shown as "1H line" of FIG. 2) and the values of both the effective pixels (effective video signals) and the ineffective pixels (blanking) in the period. The number of ineffective pixels accounts for 15% to 20% in a single scanning period. In the background-art FIFO memory, the amount of memory capacity for a single scanning line is required in order to ensure a single scanning delay, and the operation of the internal circuit of the FIFO memory can not be stopped.

On the other hand, in the FIFO memory of the first preferred embodiment, provision of the CFG 2 allows the FIFO memory to store only video signals equivalent in number to the effective pixels therein, thus ensuring reduction in the amount of memory capacity of the FIFO memory by its 15 to 20%. Moreover, it allows the operation of the internal circuit of the FIFO memory to be stopped in the ineffective data period, that is, the blanking period shown in FIG. 2, thus ensuring reduction in power consumption by its 15 to 20%.

<Specific Configuration>

Figure 3:
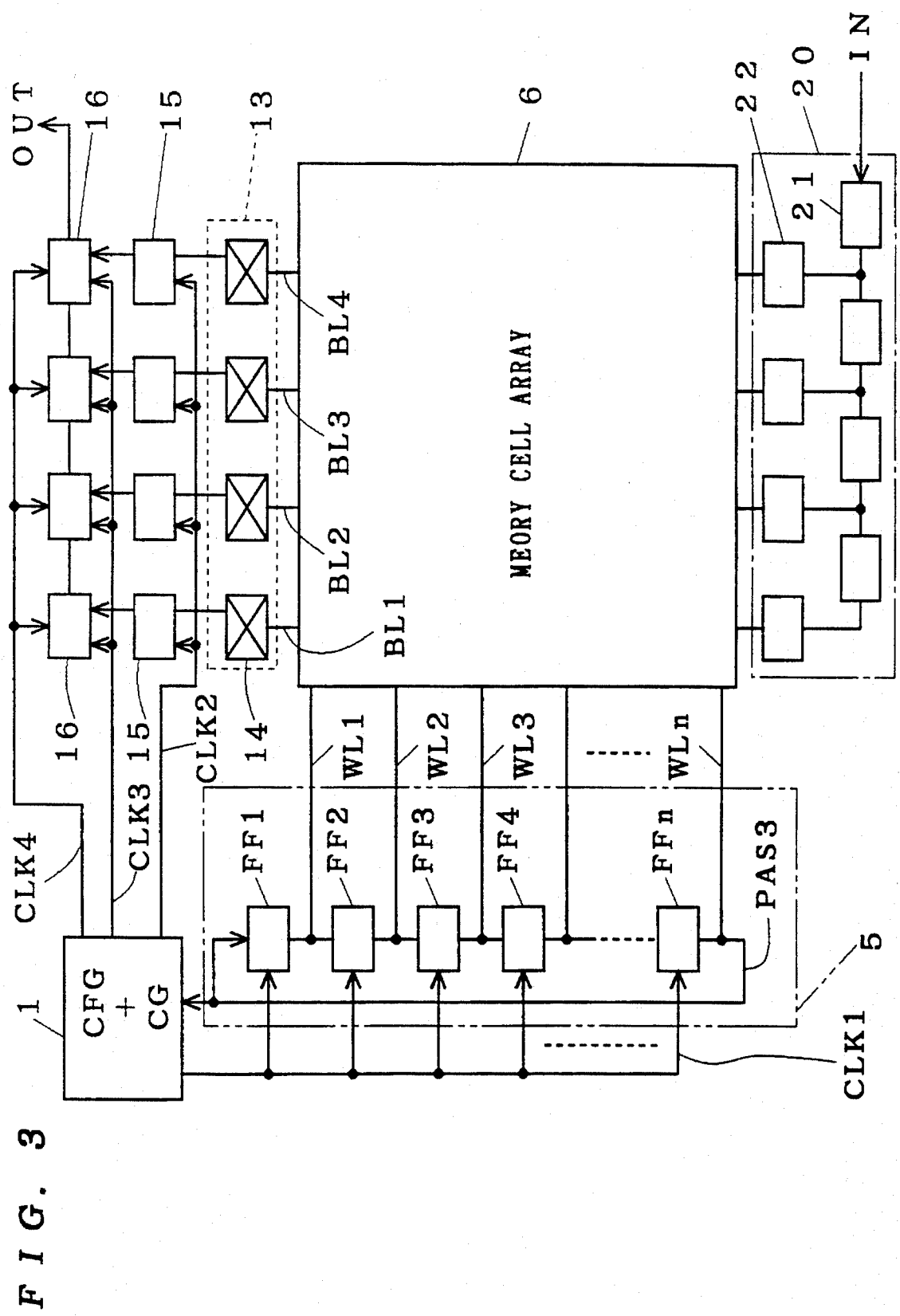
FIG. 3 is a block diagram showing a part of a specific configuration example in accordance with the first preferred embodiment of the present invention.
Figure 4:
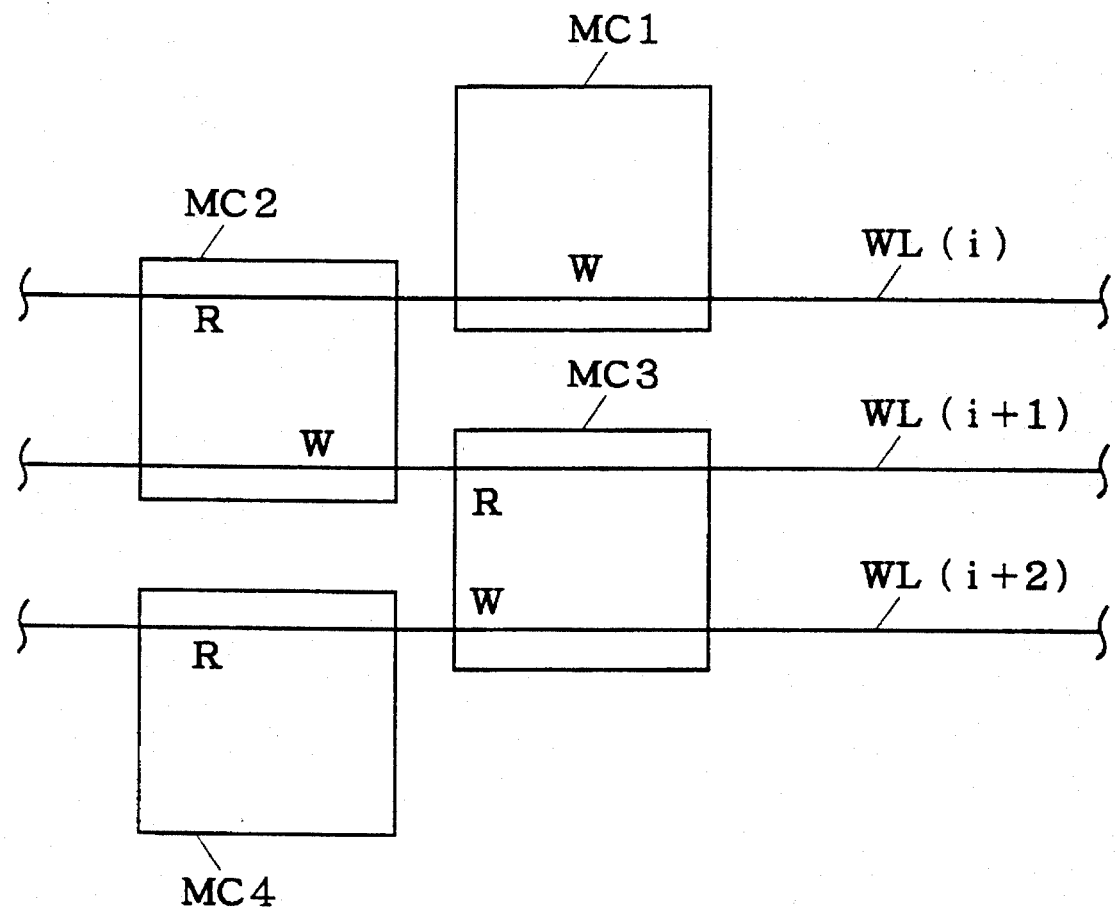
FIG. 4 is a block diagram schematically showing the relation between memory cells in a memory cell array and word lines.
Figure 5:
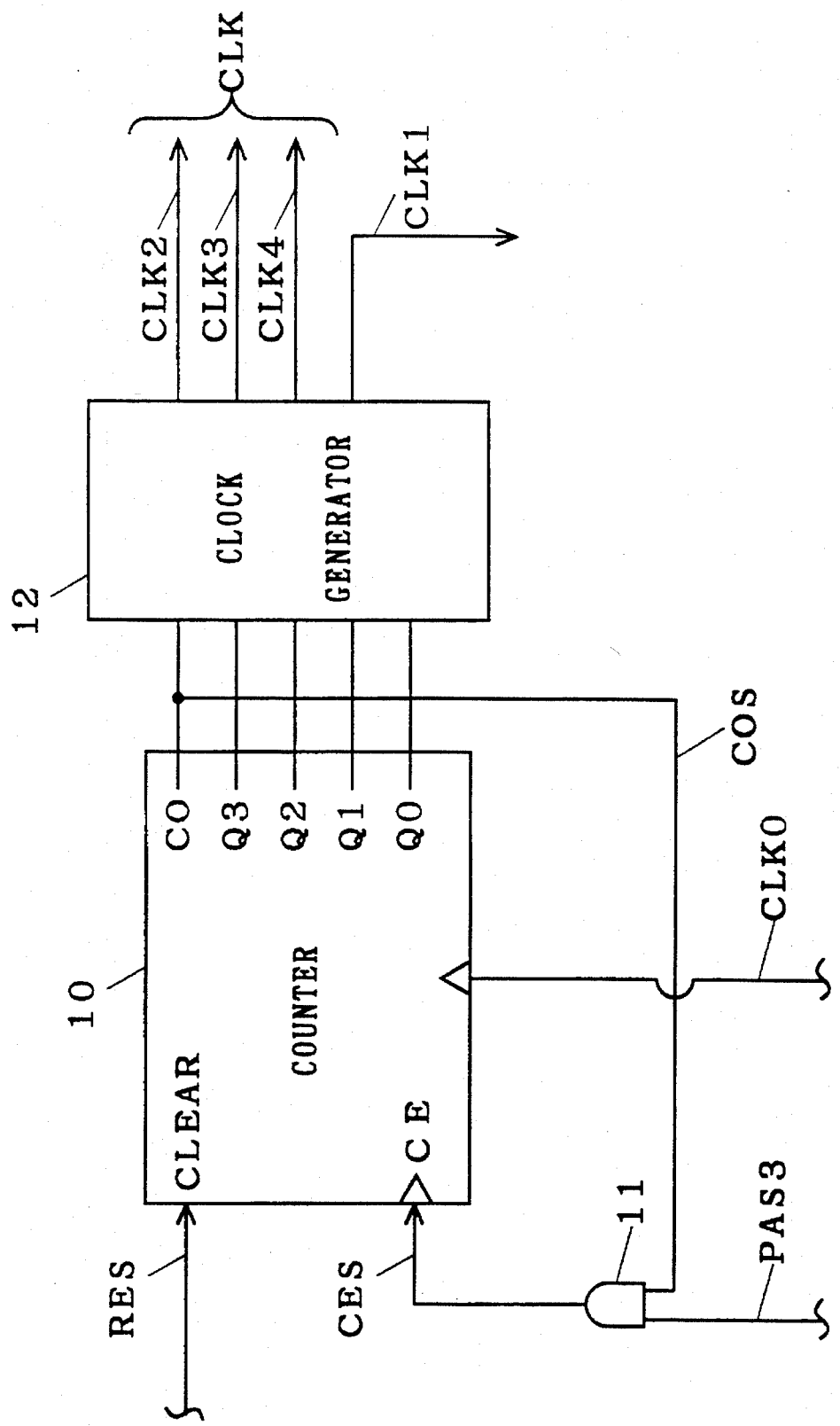
FIG. 5 is a block diagram showing a part of a specific configuration example in accordance with the first preferred embodiment of the present invention.

FIGS. 3 and 4 specifically show a configuration example of the first preferred embodiment as illustrated in FIG. 1. FIG. 3 shows a specific configuration of the memory cell array 6, I/O circuit 7 and word line pointer 4. FIG. 4 shows an exemplary relation between the memory cells in the memory cell array 6 and the word lines. FIG. 5 shows a specific configuration of the CFG 2 and CG 3.

In FIG. 3, the I/O circuit 7 consists of a read portion including a sense amplifier row 13, data registers 15 and shift registers 16 and a write portion 20 including shift registers 21 and data registers 22. Reference signs BL1 to BL4 represent bit lines. Furthermore, not shown in FIG. 3 for descriptive convenience, the write portion 20 is also controlled by a clock outputted from the (CG+CFG) circuit 1 in the same manner as shown with respect to the read portion.

The clock signal CLK shown in FIG. 1 includes the second to fourth clock signals CLK2 to CLK4 shown in FIG. 3. The second to fourth clock signals CLK2 to CLK4 have the same frequency. The second clock signal CLK2, for example, gives a timing of capturing video signals on bit lines BL1 to BL4, each of which is read through the corresponding sense amplifier 14, for example, composed of an inverter, into the data register 15. The third clock signal CLK3 is used when the video signals are transferred from the data registers 15 to the shift registers 16, respectively. The fourth clock signal CLK4 is a shift clock which is used when the video signals are shifted from one shift register 16 to the next one and finally outputted.

A word line pointer (or an address pointer) 5 uses a shift register consisting of n flip flops FF1 to FFn serially connected to each other, and sequentially provides a signal of level "1" to word lines WL1 to WLn in synchronization with the first clock CLK1. In this configuration example, since a signal on each bit line 9 of the memory cell array 6 has four-bit data (of FIG. 1), the frequency of the first clock CLK1 is a quarter that of the second to fourth clock signals CLK2 to CLK4.

This example allows the writing and reading of data to and from the memory cell array 6 to be simultaneously performed. FIG. 4 schematically shows a relation between internal memory cells MC1 to MC4 of the memory cell array 6 and the word lines WL(i), WL(i+1) and WL(i+2). As can be seen from this figure, when the word line WL(i) receives a signal of level "1", the memory cell MC1 starts a write operation and the memory cell MC2 starts a read operation. Next, when the word line WL(i+1) receives a signal of level "1", the memory cell MC2 starts a write operation and the memory cell 3 starts a read operation. When the word line WL(i+2) receives a signal of level "1", the memory cell 3 starts a write operation and the memory cell MC4 starts a read operation.

In discussions later on another preferred embodiments, the memory cell array 6 also has such a configuration as shown in FIG. 4. Naturally, the present invention is also applicable to a memory cell array having word lines (and a write address pointer) only for writing and word lines (and a read address pointer) only for reading separately.

FIG. 5 specifically shows a configuration of a (CFG+CG) circuit 1 which combines both functions of the CFG 2 and the CG 3, consisting of a counter 10, an AND circuit 11 and a clock generator 12. The counter 10 is reset by receiving the reset signal RES (which corresponds to the horizontal synchronous signal) which is externally applied to its CLEAR terminal, and then starts an operation of counting the reference clock CLK0. The number of counts is outputted as a 4-bit signal from output terminals Q0 to Q3 to the clock generator 12 (corresponding to another clock generator). Receiving the number of counts, the clock generator 12 outputs the first to fourth clock signals CLK1 to CLK4. Furthermore, the counter 10 outputs a carry-out signal COS from its CO terminal at a timing when the number of counts reaches the maximum value.

In this example, a signal PAS3' for detecting the specification of the last address of the last line (that is, detecting a timing of writing or reading the last pixel of a single scanning line) is detected by use of the carry-out signal COS. Specifically, the AND circuit 11 functions as detecting means for detecting the specification of the last address of the last line, and obtains an AND signal (logical product) of the last line access signal PAS3 and the carry-out signal COS to output the signal as a count enable signal CES. The count enable signal CES corresponds to the last address access signal PAS3'.

When the count enable signal CES is applied to the count enable terminal CE of the counter 10, the counter 10 stops its count operation and remains in a stopped state for a period of time ($\Delta t_{BLK}$ of FIG. 6) until the CLEAR terminal receives the reset signal RES. Therefore, it becomes possible to write/read the video signals equivalent to the effective pixels during a single scanning period (1H Line). Moreover, utilizing the function of the counter 10 and the output thereof ensures design simplicity and keeps the circuit scale from increasing.

Figure 6:
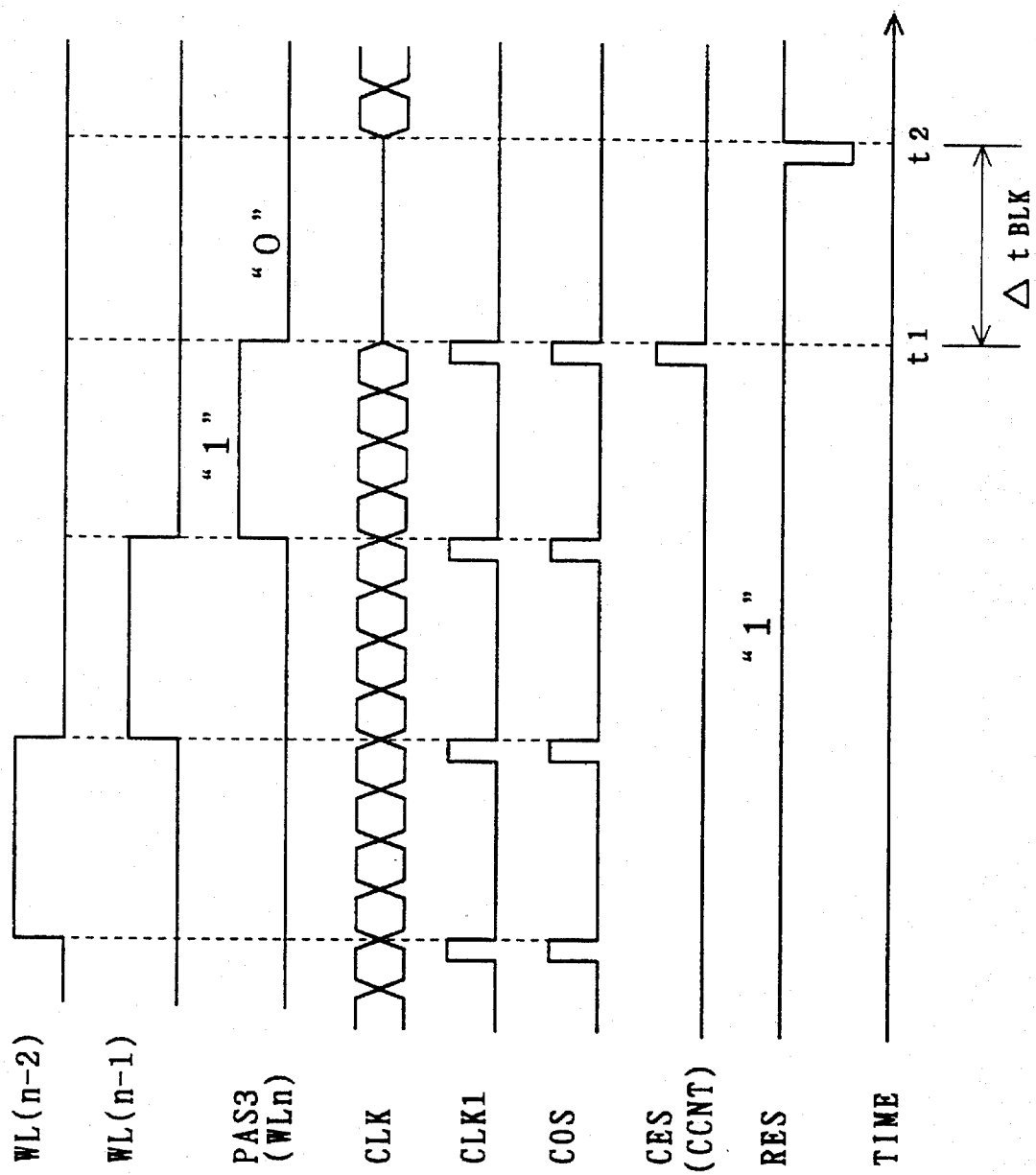
FIG. 6 is a timing chart illustrating an operation of the circuit of FIGS. 3 and 4.

The timing chart of FIG. 6 shows the operation of the counter 10 as discussed above. At a time t1, the counter 10 stops its operation, and thereby outputting the second to fourth clock signals CLK1 to CLK 4 is stopped. At a time t2, the counter 10 restarts its operation. Accordingly, the period of time $\Delta t_{BLK}$ is the blanking period.

In FIG. 6, furthermore, the count enable signal CES which is an input signal for activating the count enable function of the counter 10 falls into an L level at the time t1. Substantially, however, the count enable signal CES is still in an H level during the period $\Delta t_{BLK}$ from the time t1 to the time t2 since the counter 10 remains in the stopped state by the count enable function during the period from t1 to t2.

In the example of FIG. 5, the CO terminal (for outputting carry-out signals COS) and the carry-out function of the counter 10 and the AND circuit 11 serve as detection means (or predetermined address access signal generating means)

for detecting the last address access signal PAS3', and the CE terminal and the count enable function of the counter 10 serve as the clock control signal generating means for controlling a stop of the operation of the addressing means. In other words, the carry-out function and the count enable function of the counter 10 and the AND circuit 11 correspond to the CFG 2 shown in FIG. 1, and accordingly correspond to "the control means". The CLEAR terminal function and the count output terminal functions Q0 to Q3 of the counter 10 and the clock generator 12 correspond to the CG 3 shown in FIG. 1, and these functions and the word line pointer 5 and I/O circuit (consisting of 13, 15, 16 and 20) of FIG. 3 correspond to "the addressing means".

<The Second Preferred Embodiment>

Although the signal which is inputted to the CFG is limited to an output from the last pointer of the address pointer of the FIFO memory in the first preferred embodiment, the second preferred embodiment additionally provides a function (four-to-one selector 23 of FIG. 7) by which one of outputs from several given locations of the address pointer can be selectively inputted to the CFG. Now, discussion will be presented below referring to FIG. 7.

Figure 7:
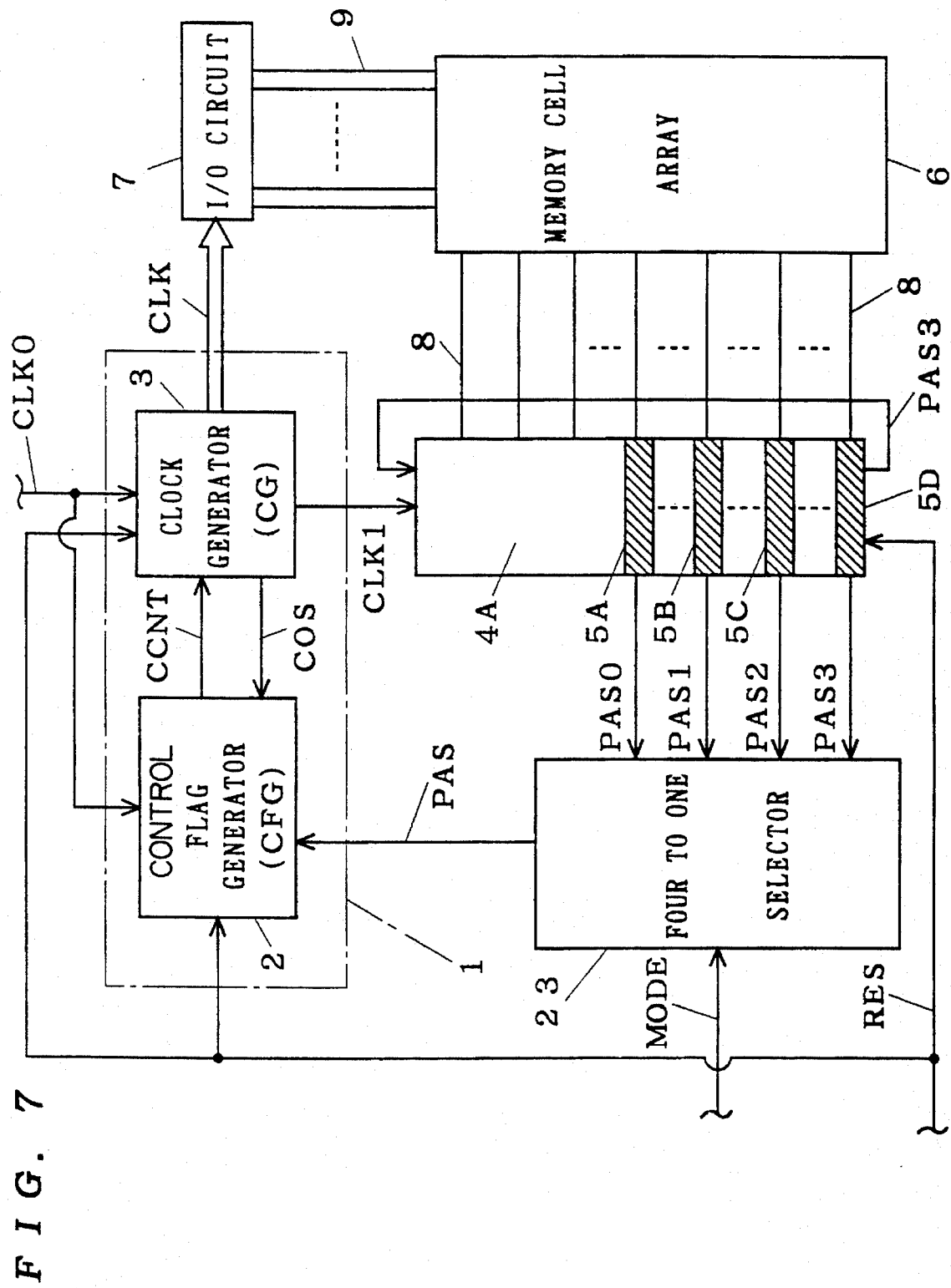
FIG. 7 is a block diagram of a configuration in accordance with a second preferred embodiment of the present invention.

The CFG 2, CG 3, I/O circuit 7 and memory cell array 6 of FIG. 7 are identical to those of FIG. 1. The characteristic feature of the second preferred embodiment, as described above, lies in provision of a word line pointer (or address pointer) 4A and a four-to-one selector 23. The word line pointer 4A is configured by using a shift register, and four pointers 5A, 5B, 5C and 5D in the shift register output address signals PAS0 to PAS3 which indicate the respective specifications of the word lines corresponding to the four pointers 5A to 5D to the four-to-one selector 23. The pointers 5A, 5B and 5C are pointers indicating the given locations which are determined in accordance with the possible numbers of effective pixels of the video signals (input source) and the pointer 5D is the last pointer specifying the last word line.

A mode signal MODE to be applied to the four-to-one selector 23 gives a command by which one of the address signals PAS0 to PAS3 should be selected. The mode signal MODE is determined in accordance with the number of effective pixels of the actually inputted video signals.

The word line pointer 4A is reset to the first pointer in response to the reset signal RES when one of the address signals PAS0, PAS 1 and PAS2 corresponding to the pointers 5A, 5B and 5C, respectively, is selected.

In the second preferred embodiment, the CFG 2 and the four-to-one selector 23 correspond to "the control means", and the CG 3, the I/O circuit 7 and the word line pointer 4A correspond to "the addressing means". A generating unit 50 (which corresponds to "the predetermined address access signal generating means") for generating a predetermined address access signal PAS' (not shown) on the basis of two signals COS and PAS in the CFG 2 and the four-to-one selector 23 correspond to "the detection means".

The operation and effect of the second preferred embodiment will be discussed referring to the timing chart of FIG. 8. Receiving the mode signal Mode, the four-to-one selector 23 selects one of the four address signals (PAS0, PAS1, PAS2, PAS3) and outputs the selected one to the CFG 2 as the predetermined line access signal PAS. The CFG 2 detects and generates the predetermined address access signal PAS' (not shown in FIG. 7), which gives a timing of writing/reading the last pixel in a single scanning line, on the basis of the predetermined line access signal PAS and the clock signal COS outputted from the CG 3 (in synchronization with the first clock signal CLK1) and thereby generates and outputs a clock control signal CCNT. The second preferred embodiment performs the same operation as the first preferred embodiment in this point and later.

<Effect>

Figure 8:
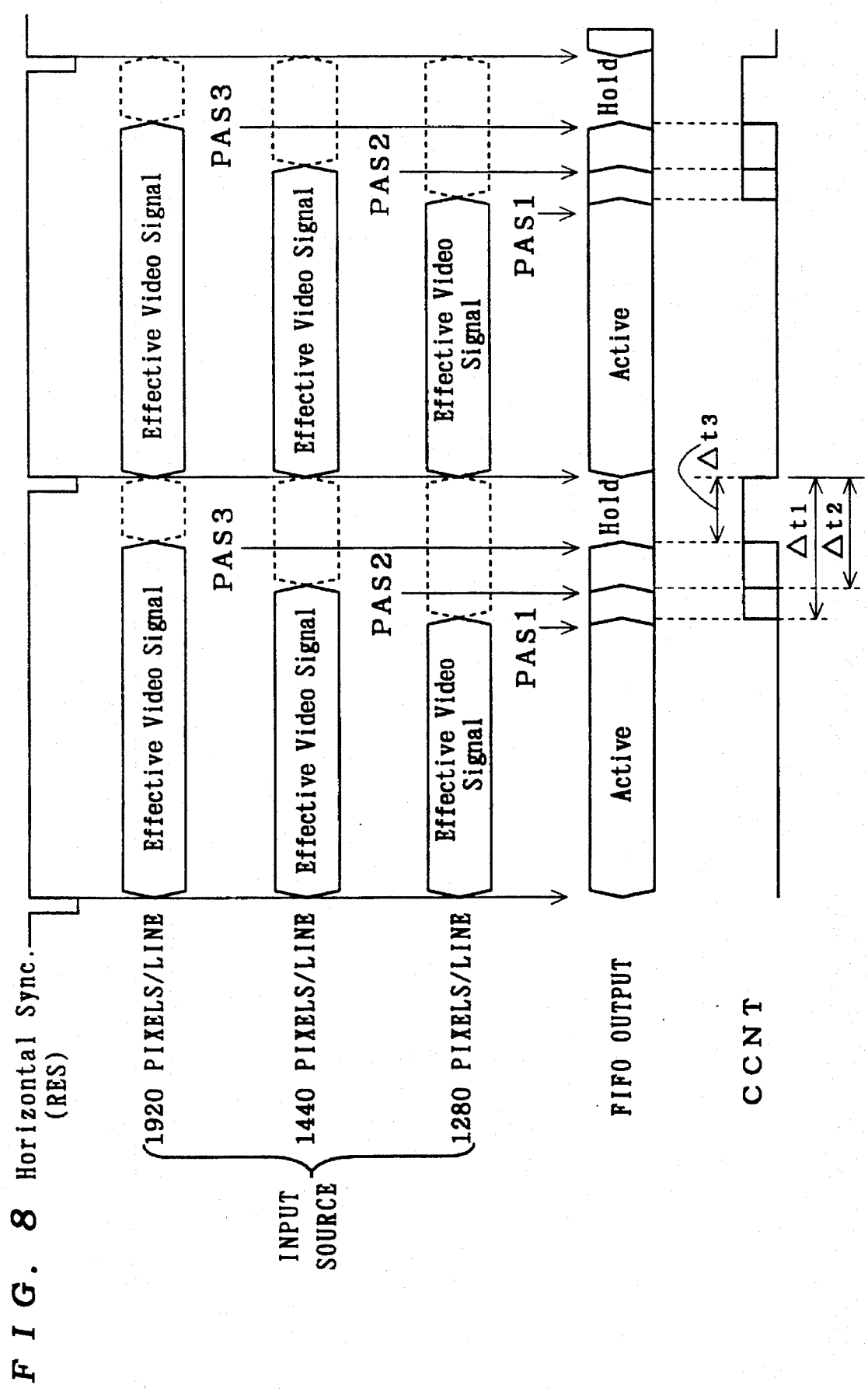
FIG. 8 is a timing chart illustrating an operation in accordance with the second preferred embodiment of the present invention.

The technique of the second preferred embodiment is desirably applied to a system which has a wide variety of word lengths to be stored in the memory cell array 6 depending on the input source, as shown in FIG. 8. As an example of such use, the ATV, a new video signal processing system in U.S.A., has three types of possible numbers of effective pixels in a single scanning line, 1920/1440/1280, depending on the input source.

In the background-art FIFO memory, provision of memory capacity for one scanning line enables all of these formats to be implemented, consuming unnecessary memory capacity for ineffective data and causing an increase in power consumption.

By the way, an FIFO memory which is capable of storing 1920 words of effective pixels can be used for storing any number of pixels that an input source has, with the technique of the first preferred embodiment. In this case, however, there arises a problem that the internal circuit of the FIFO memory with the technique of the first preferred embodiment remains operating until it stores 1920 pixels even when the number of pixels is 1440 or 1280, not optimizing power consumption.

In the second preferred embodiment, provision of the selector 23 is intended to optimize the operation of the internal circuit of FIFO memory in accordance with the number of effective pixels of the input source. Referring to FIG. 8, with respect to the first input source which has 1920 words of effective pixels in a single scanning line of 2000 words, the last line address signal PAS3 is selected by the four-to-one selector 23, causing a blanking period $\Delta t3$. With respect to the second input source which has 1440 words of effective pixels in the single scanning line of 2000 words, the address signal PAS2 outputted from the pointer 5C is selected by the four-to-one selector 23, causing a blanking period $\Delta t2$. With respect to the third input source which has 1280 words of effective pixels in the single scanning line of 2000 words, the address signal PAS1 outputted from the pointer 5B is selected by the four-to-one selector 23, causing a blanking period $\Delta t1$.

Thus, the operation period of the FIFO memory can be optimized in accordance with the type of the input source and thereby the operation of outputting the clock signal CLK and the first clock signal CLK1 is stopped during unnecessary period, resulting in even more reduction in power consumption.

Furthermore, the second preferred embodiment does not allow the memory capacity to be reduced to less than 1920 words because of the need for storing 1920 words of pixels.

A selector used for the second preferred embodiment is not limited to the four-to-one selector 23 of FIG. 7. The second preferred embodiment may employ a selector which is capable of selecting a signal outputted from a predetermined word line among at least two address signals which are determined in accordance with the number of effective pixels of the input source.

Figure 9:
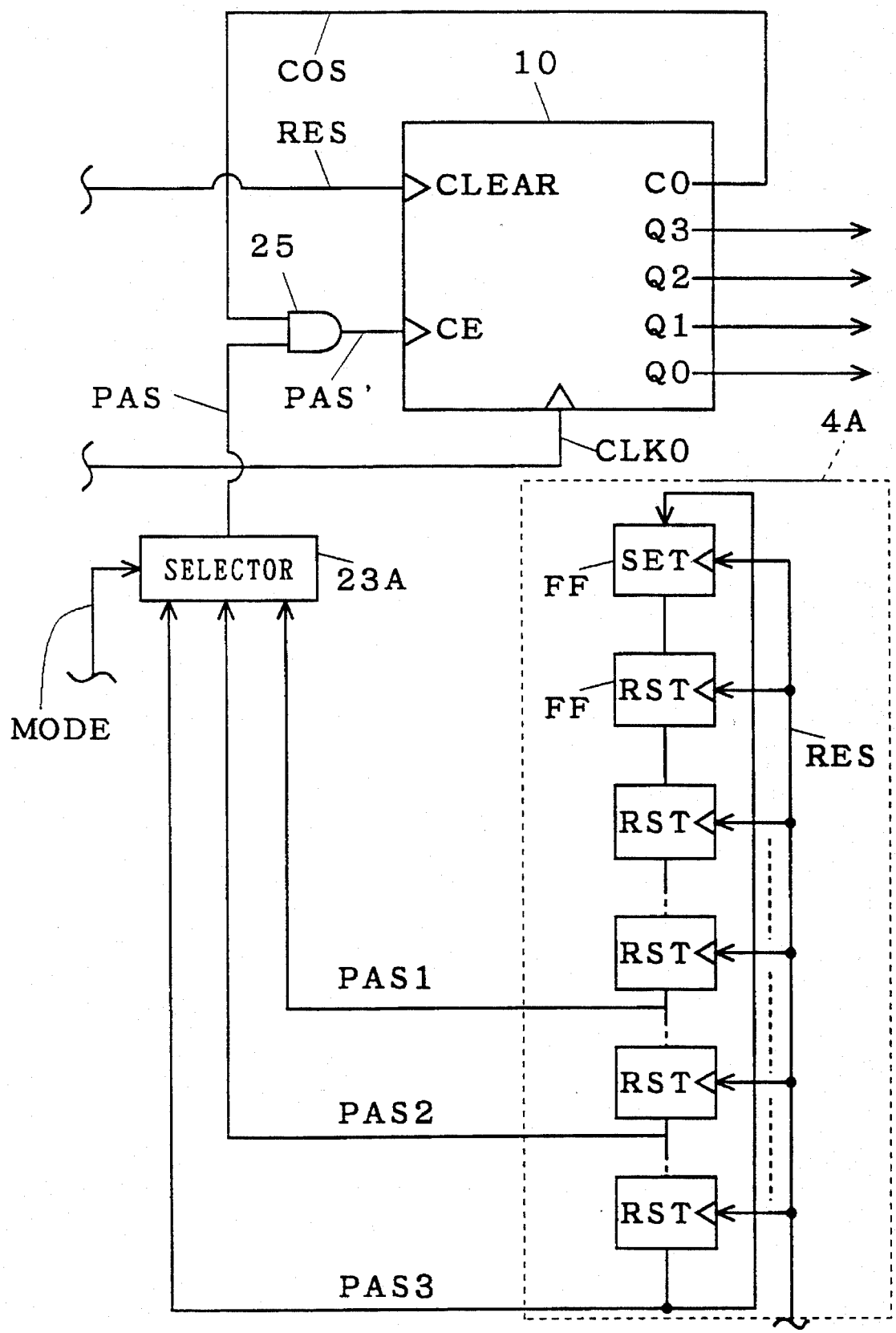
FIG. 9 is a block diagram showing a specific configuration example of a main portion of the sequential access memory in accordance with the second preferred embodiment of the present invention.

FIG. 9 shows components which correspond to the (CFG+CG) circuit 1, the selector 23 and the word line pointer 4A of FIG. 7, more specifically than FIG. 7. The selector 23A of FIG. 9 selects a predetermined word line access signal PAS among three address signals PAS1 to PAS3.

The function of the (CFG+CG) circuit 1 is implemented by the counter 10 with its carry-out function and count enable function and the AND circuit 25 like in the first preferred embodiment. The AND circuit 25 functions as "the predetermined address access signal generating means" in cooperation with the carry-out function of the counter 10, and more specifically, it generates a predetermined address access signal PAS' on the basis of the signal PAS outputted from the selector 23A and the carry-out signal COS outputted from the counter 10 and outputs the generated signal to the count enable terminal CE of the counter 10 as a count enable signal. Then, the count enable function of the counter 10 serves as "the clock control signal generating means", internally generating a clock control signal.

In FIG. 9, the illustration of the first clock CLK1 (as shown in FIG. 7) to be inputted to each flip flop FF of the word line pointer 4A is omitted.

<The Third Preferred Embodiment>

Figure 10:
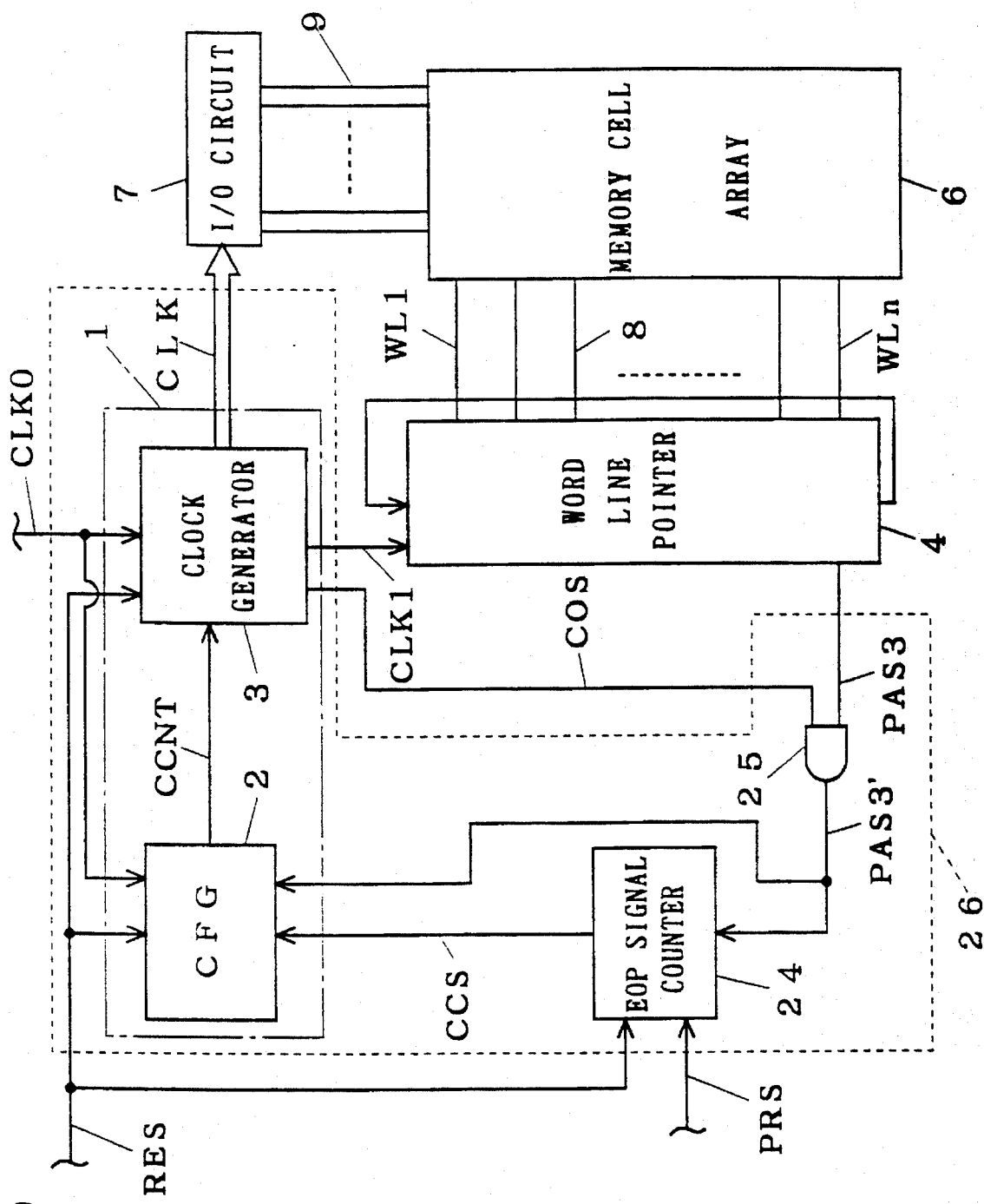
FIG. 10 is a block diagram of a configuration in accordance with a third preferred embodiment of the present invention.

FIG. 10 is a block diagram showing a configuration in accordance with the third preferred embodiment. In addition to the first preferred embodiment, counting means (end-of-page EOP signal counter 24: hereinafter simply referred to as counter 24) is provided to count the last address access signal PAS3'. When the counted number of the last address access signal PAS3' reaches "a predetermined number to be counted" given by a load signal PRS, the counter 24 outputs a signal CCS to CFG 2, thereby activating the function of the CFG 2. The last address access signal PAS3', which is obtained by operation of the AND circuit 25 as a logical product of the signal COS in synchronization with the first clock signal CLK1 and the last access signal PAS 3, indicates a timing of writing/reading the pixel at some midpoint or the last pixel in a single scanning line to/from the last address of the last word line WLn. Activated in response to the signal CCS, the CFG 2 generates and outputs a clock control signal CCNT which rises to an H level at a timing delayed for one cycle of the reference clock CLK0 from the timing of inputting the last address access signal PAS3' after inputting the signal CCS.

In the third preferred embodiment, the region 26 surrounded by a broken line in FIG. 10 (where no function of the CG 3 other than outputting the signal COS is included) corresponds to "the control means". The signal COS and the AND circuit 25 correspond to "the detection means", and the counter 24 and the CFG 2 correspond to "the clock control signal generating means".

The operation of the third preferred embodiment will be discussed with reference to the timing chart of FIG. 11, assuming now that each FIFO memory, i.e., each memory cell array 6 of FIG. 10 stores 160 words and the predetermined number to be counted by the EOP signal counter 24 which is given by the load signal PRS is 8 (160 words×8= 1281) words).

Figure 11:
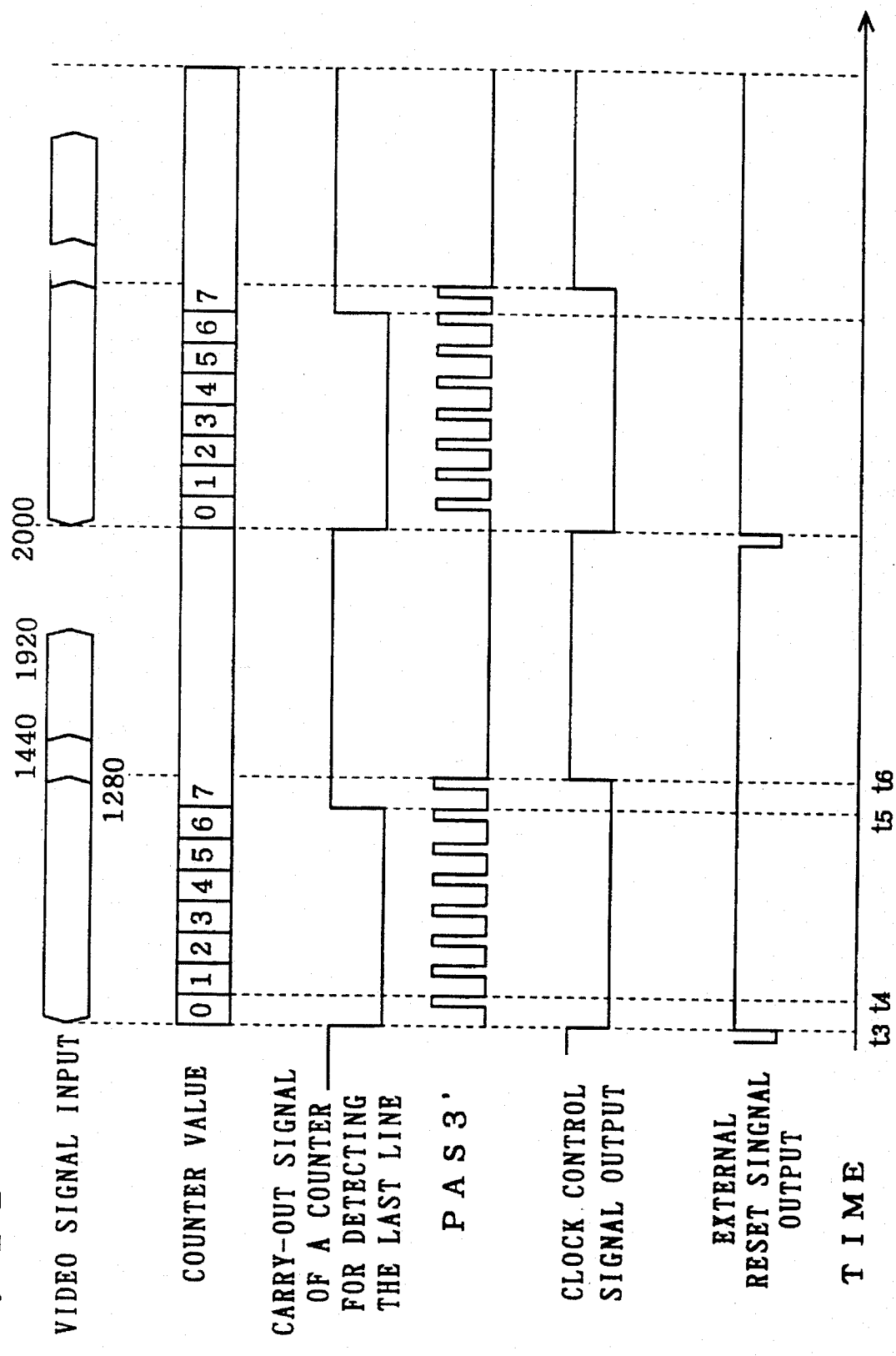
FIG. 11 is a timing chart illustrating an operation in accordance with the third preferred embodiment of the present invention.

At the same time when the count value of the EOP signal counter 24 is reset to 0 in response to the reset signal RES which is externally given, each part of the FIFO memory starts its operation (at the time t3 of FIG. 11). When access for 160 words of video signals has been made, the EOP signal counter 24 is incremented by 1 in response to a pulse of the last address access signal PAS3' (at the time t4). Thus, the last address access signal PAS3' just indicates the timing of writing or reading 160 words of data. At the same time, the word line pointer 4 goes back to the first line and continuously makes access to the first line of the memory. When 160 words of video signals have been written or read again, the EOP signal counter 24 is incremented by 1 to "2" in response to the last address access signal PAS3'. On repeating this operation eight times, the counter value of the counter 24 reaches "7" (at the time t5), and the EOP signal counter 24 in which carry-out is needed outputs a carry-out signal to the CFG 2 as the signal CCS, thereby activating the CFG 2. After that, when the word line pointer 4 reaches the last line again and the last address access signal PAS3' is inputted to the CFG 2 (at the time t6) while the CFG 2 is in an active state, the CFG 2 starts outputting the clock control signal CCNT, thereby stopping the operation of the FIFO memory. Then, receiving the reset signal RES which is externally given, the CFG 2 is reset and the FIFO memory starts its operation.

<Effect>

Thus, in the third preferred embodiment, the word line pointer 4 serves as a ring pointer, and the function of counting the numbers of rounds of the ring pointer to stop outputting the clock signal CLK and the first clock signal CLK1 is added to the first preferred embodiment.

This function makes it possible to continuously repeat the operation of the FIFO memory, where the access to the last memory cell of the last line is followed by the access to the memory cell of the first line, before stopping the operation of the internal circuit of the FIFO memory. The number of operations to be repeated, i.e., the number to be counted which is indicated by the signal LDS, depends on the number of effective pixels of the inputted video signals.

In the example shown in FIG. 11, access is made to the memory cell array 6 eight times and 160 pixels of video signals are stored in the memory cell array 6 in each access, and accordingly, 1280 pixels of video signals are outptutted from the I/O circuit 7 during a single scanning (1H-line). Therefore, the operation of the FIFO memory can be stopped during the blanking period for the ineffective data from the 1281th pixel to the 2000th pixel, and thereby reduction in power consumption can be achieved. Moreover, a single scanning of 1280 pixels per line of video signals can be implemented with an FIFO memory having memory capacity of 160 words, and therefore, the need for provision of an FIFO memory having memory capacity of 2000 words or 1280 words is eliminated and reduction in memory is achieved.

Figure 12:
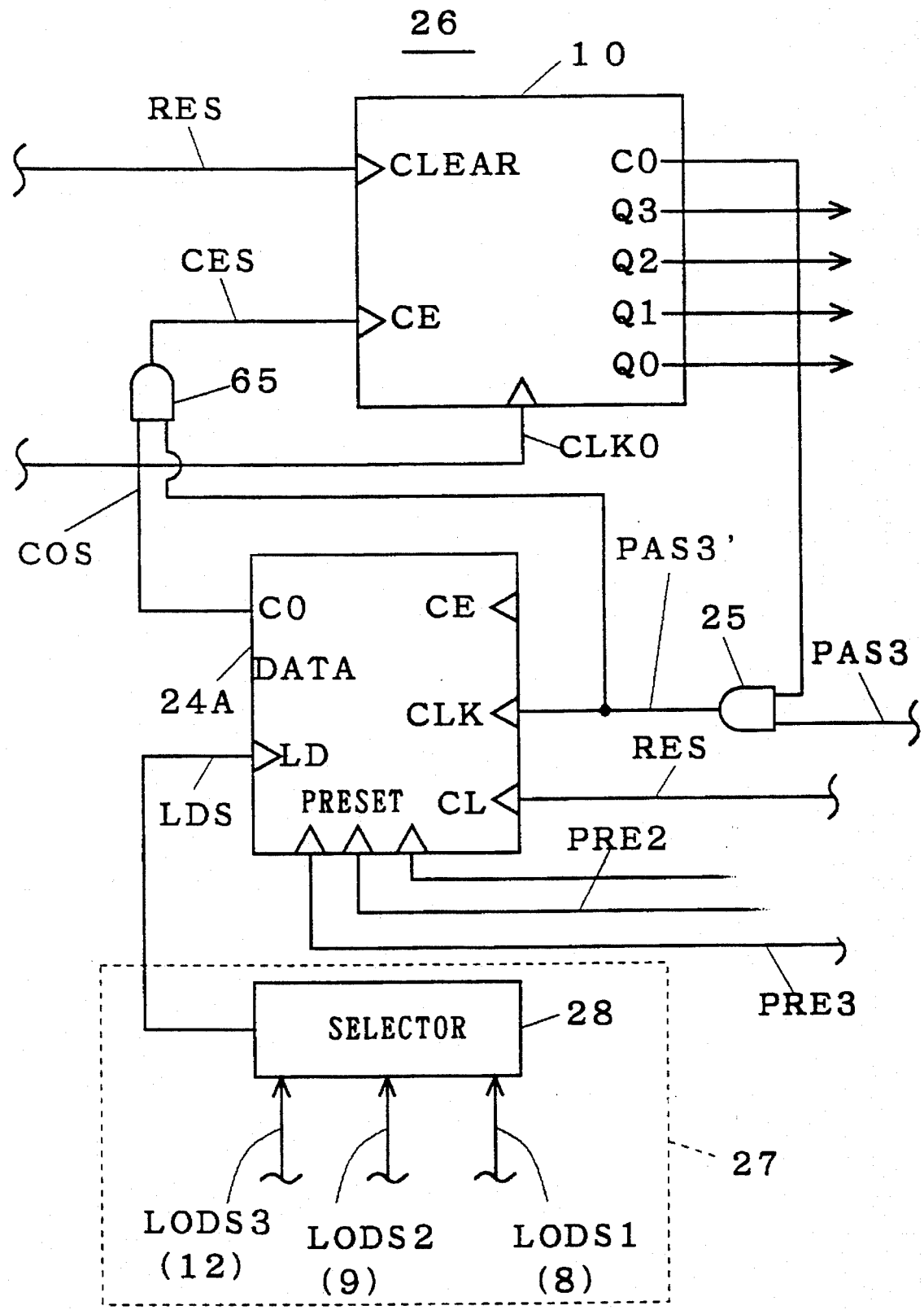
FIG. 12 is a block diagram showing a specific configuration example of a main portion of the sequential access memory in accordance with the third preferred embodiment of the present invention.

FIG. 12 is a block diagram specifically showing a configuration example of the region 26 (the control means) including the (CFG 2+CG 3) circuit 1, the EOP signal counter 24 and the AND circuit 25 of FIG. 10. A broken line region 27 is not concerned in this example, but in the first variation discussed later.

The combination of the counter 10 and the AND circuit 65 of FIG. 12 have the same function as the (CFG 2+CG 3) circuit 1 of FIG. 10. Specifically, an AND signal CES which is a logical product of an output signal COS from a carry-out terminal CO of the EOP signal counter 24A and the signal PAS3' functions as a count enable signal to be inputted to the count enable terminal CE of the counter 10 (the counter 10 stops its operation at the point in time when the signal CES falls in level from "1" to "0"). The output signal from the CO terminal corresponds to the signal CCS shown in FIG. 10, and a signal which is generated within the counter 10 by the count enable function of the counter 10 corresponds to the signal CCNT shown in FIG. 10. In this example, a predetermined number to be counted "8" which is given by a preset load signal LDS is applied to a preset terminal PRESET of the EOP signal counter 24A.

<The First Variation of The Third Preferred Embodiment>

Provision of a load value selection unit 27 shown in FIG. 12 makes the FIFO memory adaptable to a variety of types of input sources having different numbers of effective pixels in a single scanning line (1H line). Specifically, three preset load signals, i.e., the first preset load signal LODS1, the second preset load signal LODS2 and the third load signal LODS3, are applied to a selector 28, and the selector 28 selects one of the three preset load signals to output the selected one as the preset load signal LDS. The first to third preset signals PRE1 to PRE3 corresponding to the first to third preset load signals LODSI to LODS3, respectively, are applied to the respective preset terminals PRESET.

In FIG. 12, for example, the numbers to be counted which are indicated by the first to third preset load signal LODSI to LODS3 are "8" (160 words×8=1280 words) which is given by the first preset signal PRE1, "9" (160 words ×9=1440 words) which is given by the second preset signal PRE2 and "12" (160 words×12=1920 words) which is given by the third preset signal PRE3, respectively. The appropriate selection of the preset load signal from the first to third preset load signals LODS1 to LODS3 made by the selector 28 in accordance with the number of effective data of the input source enables the writing/reading of a variety of input sources having different numbers of words to be performed with the memory cell array 6 having small memory capacity of 160 words its discussed in the third preferred embodiment, thus ensuring reduction in power consumption and in memory capacity in a flexible manner.

In other words, the first variation controls the number of rounds of the word line pointer 4 serving as a ring pointer in accordance with the number of effective pixels of the input source, to stop the operation of the internal circuit of the FIFO memory.

<Another Example of Application of The Third Preferred Embodiment>

In the above discussions of the third preferred embodiment and the first variation, the FIFO memory of FIG. 10 is applied to the operation of writing/reading video signals (pixels) in a single main scanning line (in horizontal direction). The FIFO memory of FIG. 10 is also applicable to, e.g., a case where the video signals stored therein are outputted to a TV screen for display, and can produce an effect of storing only effective pixels in a vertical direction of a TV frame.

Figure 13:
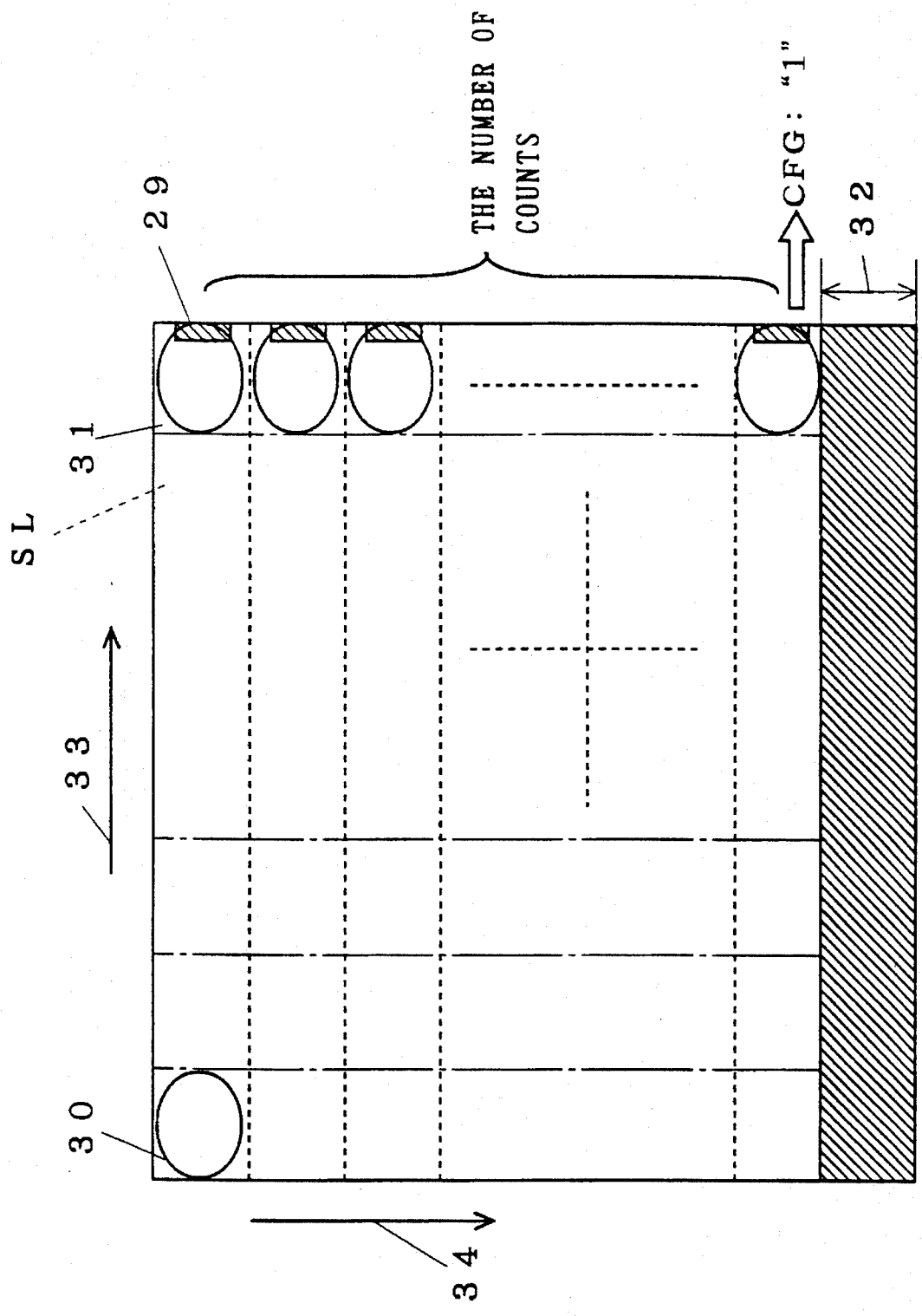
FIG. 13 shows an application of the sequential access memory in the third embodiment to a TV image.

As an example of the case, assuming now that the memory cell array 6 has memory capacity of 2000 words, a pixel which is read from the last address of the last word line WLn is the last pixel 29 in a TV frame shown in FIG. 13. In FIG. 13, the reference numeral 30 denotes each pixel of the first line of the memory cell array 6, 31 denotes each pixel of the last line of the memory cell array 6, the reference numerals 33 and 34 represent a horizontal direction and a vertical direction, respectively, and the reference sign SL denotes a single scanning region in the horizontal direction 33. In this application, the EOP signal counter 24 of FIG. 10 counts the number of scanning lines in the vertical direction 34 of FIG. 13. When the counter value of the counter 24 reaches a predetermined number to be counted, a scanning in the vertical direction 34, i.e., writing/reading of video signals to/from the memory cell array 6 is completed and a blanking region 32 in the vertical direction 34 is ensured. Therefore, the operation of the internal circuit of the FIFO memory can be stopped during a period of scanning time corresponding to the blanking region 32, and thereby reduction in power consumption can be achieved.

Thus, also with respect to the effective pixels in the vertical direction of the TV image, the FIFO memory of FIG. 10 enables appropriate control of the operation of the internal circuit thereof and thereby ensures reduction in power consumption.

Furthermore, the same effect as above is achieved by counting the writing/reading of the first pixel of the first line as a function of the access signal of the word line pointer 5 to use the count value, instead of detection of writing/reading the last pixel 29 of the last line of FIG. 13 as the last address signal PAS3'.

<The Second Variation of The Third Preferred Embodiment>

Figure 14:
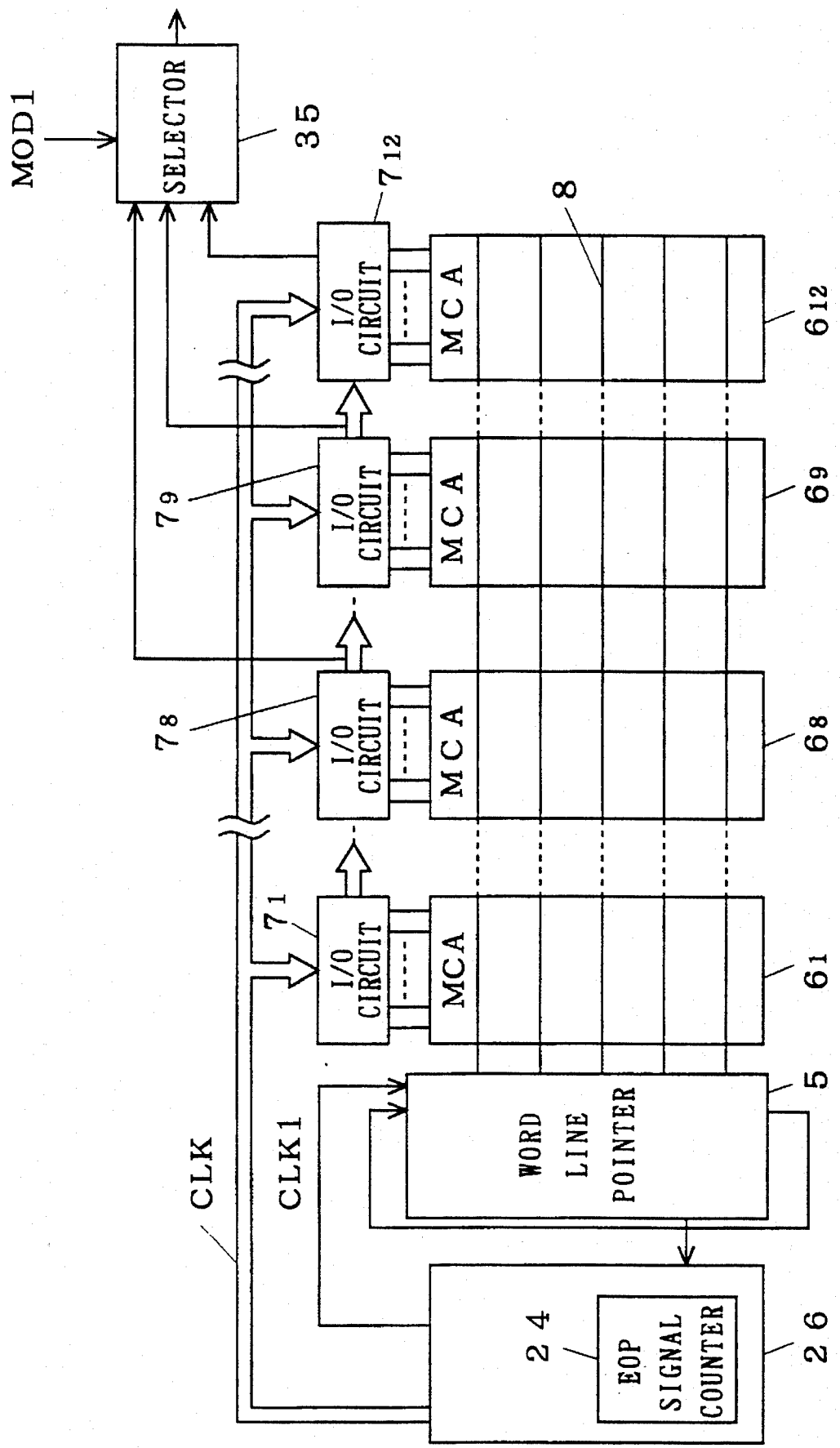
FIG. 14 is a block diagram of a variation of the third preferred embodiment of the present invention.

FIG. 14 shows a configuration example which is applicable to a system having a variety of numbers of effective pixels depending on the input source as discussed in the second preferred embodiment. In the configuration, 12 pairs of FIFO memories each of 160 words as a unit, i.e., each consisting of a memory cell array (MCA) 6 having memory capacity of 160 words and an I/O circuit 9, are connected in series or in cascade to each other to constitute an FIFO memory substantially having memory capacity of 1920 words. This configuration is achieved so that the outputs from the eighth, ninth and twelfth memory cell arrays should be selectively outputted.

A selector 35 selects one of the outputs from the eighth, ninth and twelfth I/O circuits $7_8$, $7_9$ and $7_{12}$ in accordance with a mode signal MOD1 and outputs the selected one. A variable-length FIFO memory which is capable of storing and outputting any of 1280, 1440 or 1920 words (called as a multiword FIFO memory) can be thereby implemented. In this case, when the effective pixels of 1920 words have been written and outputted, all the pairs of units stop their operations.

The configuration ensures reduction in memory capacity of the first to eighth memory cell arrays $6_1$ to $6_8$ and reduction in power consumption.

<The Third Variation of The Third Preferred Embodiment>

As a further variation of the second variation shown in FIG. 14, there may be a configuration where the preset function like the function unit 27 of FIG. 12 is provided for the counter 24 of FIG. 14 which counts the last address access signal so as to switch the number to be counted which is to be loaded to the counter 24 in accordance with the number of effective pixels of the input source. In such a configuration, it is also possible to stop the operations of all the FIFO memories ($6_1$ and $7_1$ to $6_{12}$ and $7_{12}$) at the point in time when the data of 1280 words or 1440 words have been stored. Thus, like the second preferred embodiment, power consumption can be optimized in accordance with the number of effective pixels of the input source.

<The Fourth Preferred Embodiment>

The characteristic feature of the fourth preferred embodiment lies in internal generation of the reset signal, which is externally given in other preferred embodiments, for the purpose of eliminating the need for the external control signal. The fourth preferred embodiment has the same function as the first to third preferred embodiments, and specifically, can stop outputting the clock signal at the point in time when the writing/reading of effective pixels is completed. Further, the fourth preferred embodiment keeps the word line pointer and the clock control circuit (i.e., the counter for the reference clock CLK0) operating even after stopping the clock signal, and thereby implements another function (that is, count function) during the clock-stop period, which is different from the function during memory access.

Figure 15:
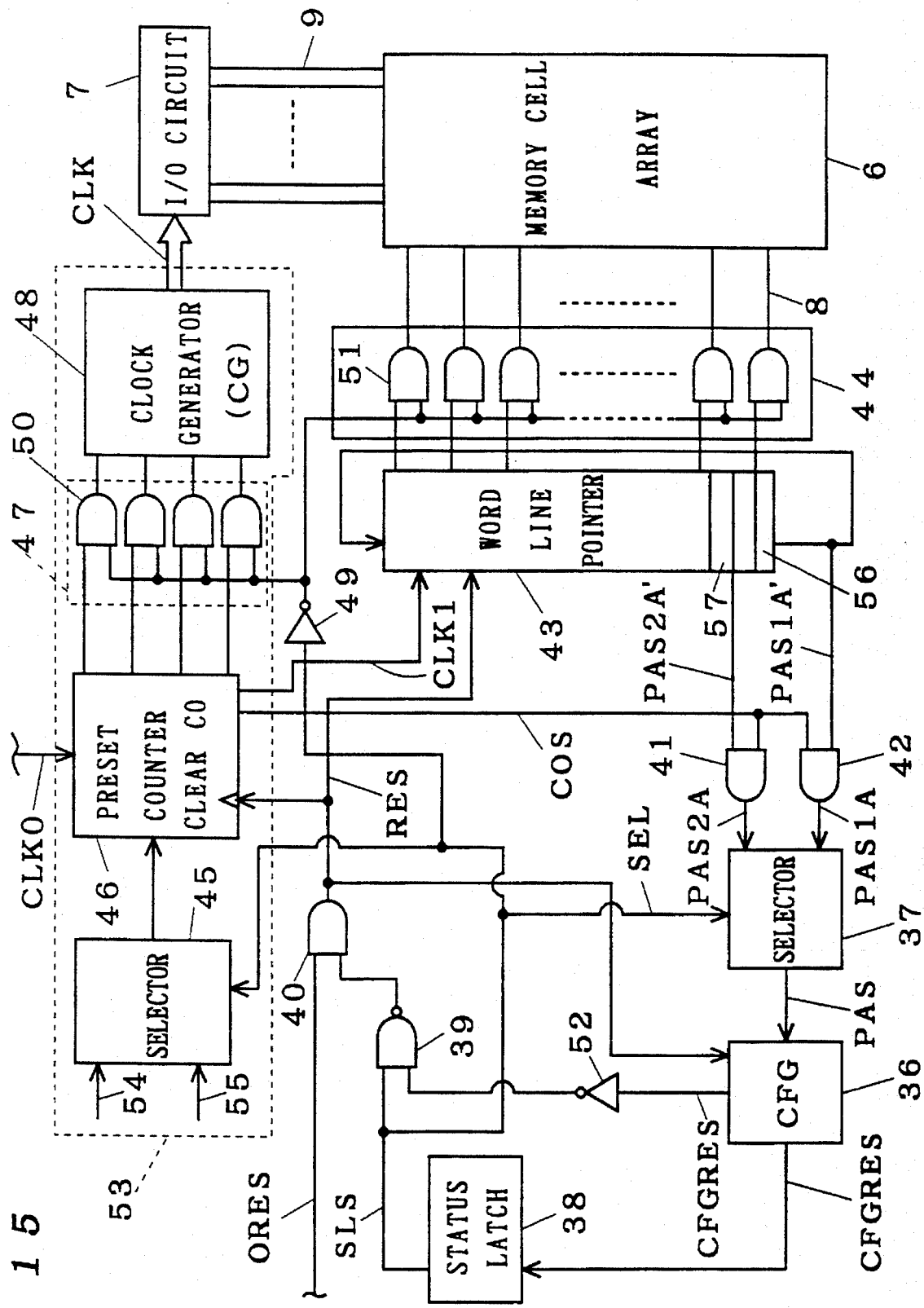
FIG. 15 is a block diagram of a configuration in accordance with a fourth preferred embodiment of the present invention.

FIG. 15 specifically shows a configuration example of the fourth preferred embodiment. A clock generation unit 53 is comprised of a selector 45 (which corresponds to the first selector) for selecting one of the first preset value 54 and the second preset value 55, a preset counter 46 having a carry-out terminal CO which allows presetting, a clock control gate 47 having AND circuits 50 and a clock generator (CG) 48. An address pointer is comprised of a word line pointer 43 and a word line control gate having AND circuits 51. A selector 37 (which corresponds to the second selector) selects a last line address access signal PAS1A indicating the last address of the last line 8 which is given by a last line access signal PAS1A' outputted from the last line pointer 56 (the first address pointer) of the word line pointer 43, in accordance with a select signal SEL. Receiving the signal PAS1A, a CFG 36 generates a clock generator control signal CFGRES (also referred to as a CFG reset signal) to inactivate the control gate 47 of the I/O circuit 7 and the control gate 44 of the word line pointer 43, and consequently the gates 47 and 44 stop access to the memory cell array 6. While both the gates stops the access, the preset counter 46 and the word line pointer 43 perform count operations independently from the function that the preset counter 46 and the word line pointer 43 perform in accessing the memory cell array 6.

Figure 16:
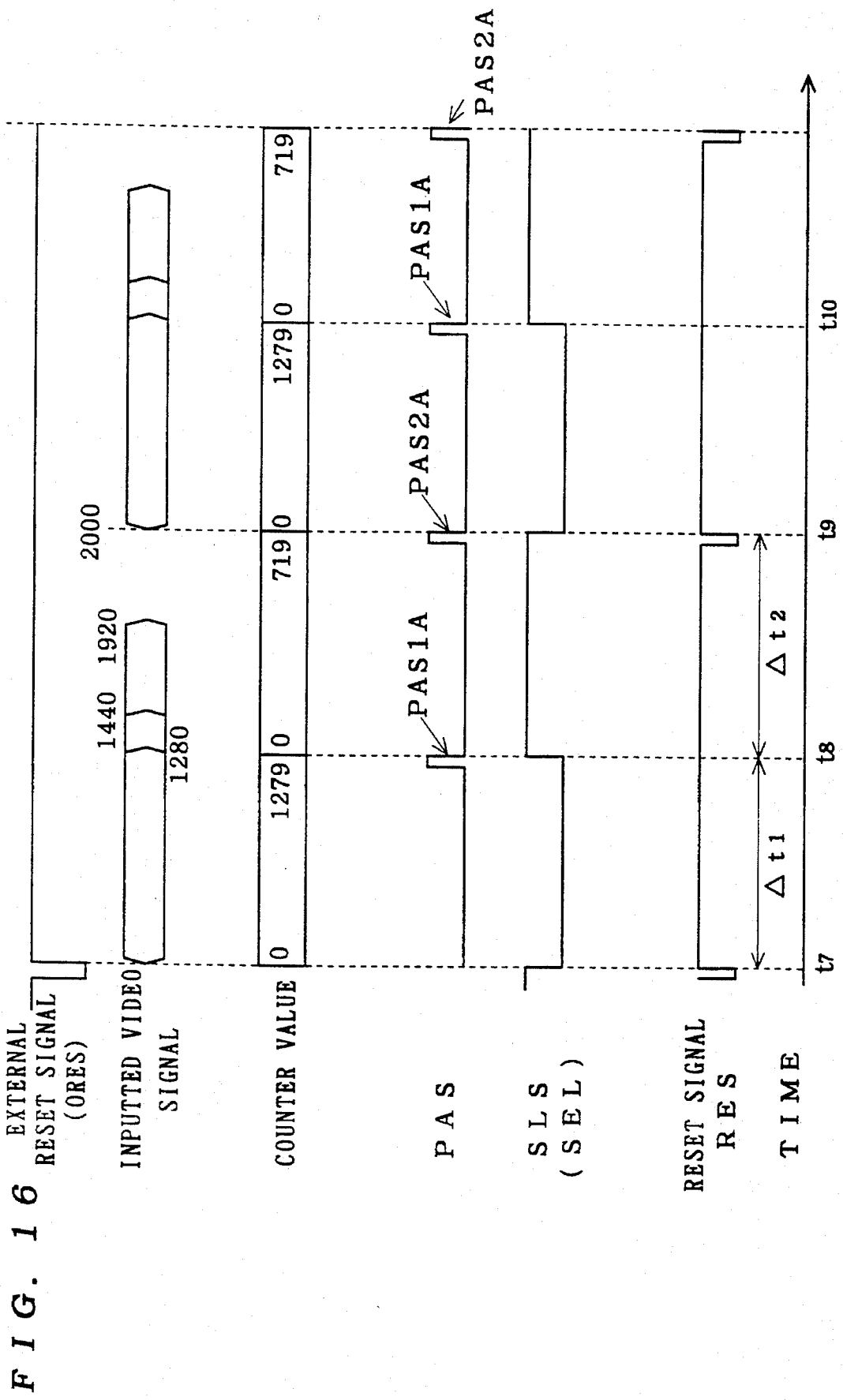
FIG. 16 is a timing chart illustrating an operation in accordance with the fourth preferred embodiment of the present invention.

The operation of the fourth preferred embodiment will be discussed, referring to the timing chart of FIG. 16. Table 1 is a truth table of an output (reset signal RES) of the AND circuit 40 with respect to an output SLS from a status latch 38, the reset signal CFGRES from the CFG 36 and an external reset signal ORES.

TABLE 1

| status latch output | CFG reset signal | external reset signal | | reset signal (RES) |
|---|---|---|---|---|
| | | L | H | |
| L | L | L | H | |
| L | H | L | H | |
| H | L | L | L | |
| H | H | L | H | |

At the time t7, in response to the first external reset signal ORES, the operation of counting the reference clock CLK0 starts from the first number to be counted which is given by the first preset signal 54. At the same time, since the output SLS (the first output signal) of the status latch 38 is in an L level (accordingly, an output of an inverter 49 is in an H level), the respective control gates 47 and 44 of the I/O circuit 7 and the word line pointer 43 are in an active state for transmitting the clock signals, and in consequence, the access to the memory cell array 6 is performed. The selector 37 outputs the last address access signal PAS1A when the select signal SEL (the first output signal) is in an L level, while it outputs a signal PAS2A which is generated by an AND circuit 41 on the basis of a signal PAS2A' (a predetermined line access signal) and a carry-out signal COS when the select signal SEL is in an H level.

After that, when the word line pointer 43 reaches the last line and the last address access signal PAS1A is detected (at the time t8: the first timing), the selector 37 outputs the last address access signal PAS1A to the CFG 36 as a signal PAS, and in consequence, the CFG 36 outputs the clock control signal CFGRES of an H level (the second level) to invert the state of the status latch 38. Specifically, the output signal SLS from the status latch 38 is inverted in state from an L level (the first level) to the H level (the second level), and accordingly, the output of the AND circuit 40 (the second output signal) through an NAND circuit 39 goes into the H level (the second level).

Receiving the signal SLS of H level, the selector 45 selects the preset value signal 55 to output the second preset value (the second number to be counted) to the preset counter 46, and consequently an initial load value of the preset counter 46 is switched. Furthermore, the selector 37 is also switched in response to the output signal SLS, i.e., the select signal SEL, and accordingly, the signal to be detected is switched from the last line access signal PAS1A' to the predetermined line access signal PAS2A' indicating that the predetermined word line has been specified. The outputs of the control gates 47 and 44 go into the L level and the clock CLK for controlling the I/O circuit 7 and the word line 8 for controlling the access to the memory cell array 6 are fixed in the L level. As a result, the access to the memory cell array 6 is stopped until the status latch 38 is inverted again (at the time t9: the second timing).

Thus, after the time t8, although the access to the memory cell array 6 is stopped, the preset counter 46 and word line pointer 43 do not stop their operations (the preset counter 46 outputs the first clock signal CLK1 to the word line pointer 43). The preset counter 46 continuously performs count operation from the second preset value which is given by the second preset value signal 55 to shift the word line pointer 43. When the second address pointer 57 for specification of a word line 8 on the location which is determined as a function of [(2000 words)—(the number of effective pixels)] is specified, the selector 37 selects the predetermined address access signal PAS2A indicating the last address of the word line indicated by the second address pointer 57 as the last access signal PAS. Receiving the last access signal PAS, the CFG 36 generates the clock control signal CFGRES of the L level (that is, the first level) (at the time t9). At the time t9, the output signal SLS from the status latch 38, which has been in the H level (the second level) until t9, is inverted into the L level (the first level) to switch the selector 37 (PAS2A→ PAS1A) and to further generate the reset signal RES (the second output signal) which is equivalent to the external reset signal RES in the first to third preferred embodiments. The preset counter 46 and word line pointer 43 are reset in response to the reset signal RES, and moreover, both of the control gates 47 and 44 are activated in response to the switching of the output signal SLS (the inversion of the output of the inverter 49). Thus, the FIFO memory goes back into an initial state, restarting the access to the memory cell array 6 (from the time t9 to t10).

In FIG. 15, the components 37, 36, 38, 52, 39, 40, 41 and 42 constitute the first and second output signal generating means. The components 36 and 38 constitute the first output signal generating means, the components 36, 52, 39 and 40 constitute the second output signal generating means and the components 41 and 42 constitute the AND circuit means. The signals PAS1A and PAS2A are output signals giving the first timing and the second timing, respectively.

<Effect>

The fourth preferred embodiment, in which the above-discussed function is added to the first preferred embodiment, has an effect of eliminating the need for externally giving the reset signal periodically. For it becomes possible to internally generate the reset signal, which has been externally generated in background arts, within the FIFO memory in the fourth preferred embodiment. Accordingly, reduction in area of the device is achieved, and moreover, improvement in design efficiency is ensured since internal generation of the reset signal eliminates the need in the background arts for designing an appropriate reset timing.

<The Fifth Preferred Embodiment>

The present invention is not limited to the access to the FIFO memory performed by use of the word line pointer employing a shift register, but is applicable to an access to a memory cell array such as DRAM performed by using a counter for addressing. Such applications will be discussed in the fifth and sixth preferred embodiments.

Figure 17:
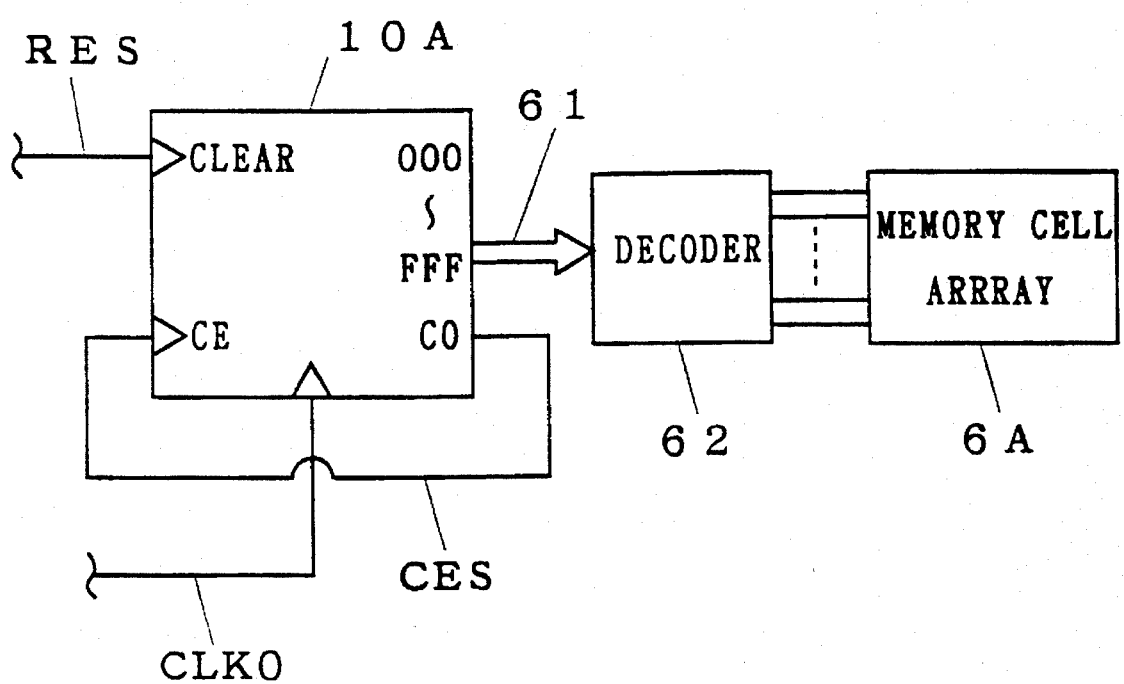
FIG. 17 is a block diagram of a configuration in accordance with a fifth preferred embodiment of the present invention.

FIG. 17 is a block diagram of a configuration of the fifth preferred embodiment. An address counter 10A functions as both the addressing means for a memory cell array 6A and the control means for detecting that the last address of the last word line has been specified to stop the operation of the addressing means.

Specifically, the address counter 10A is reset in response to the external reset signal RES, starts counting the reference clock CLK0 and outputs the count result to a decoder 62 (including a line decoder and a row decoder) as a count output signal 61. The address counter 10A has counter value ranging from "000" to "FFF" and outputs a carry-out signal indicating carry-out generation from a carry-out terminal CO when the counter value reaches "FFF". In the fifth preferred embodiment, the carry-out signal is equivalent to a count enable signal CES of FIG. 17 to be inputted to a count enable terminal CE of the address continuer 10A. If the last counter value "FFF" is set to the number of effective pixels of the inputted video signals (e.g., 1920 words), the access to the memory cell array 6A is stopped at the point in time when 1920 words of video data are written to or read from the memory cell array 6A.

The count operation may be stopped by using a midpoint counter value "FF0", "F00" or the like, as well as using the last counter value "FFF". In such a case, an address counter with load function like the counter 24A of FIG. 12, instead of the address counter 10A, should be used to change the initial value for counting. For example, when it is intended to continue the count operation until the counter value "FF0", the count operation should be started from the counter value "008".

Thus, the fifth preferred embodiment can stop the operation of the internal circuit of the FIFO memory during a blanking period, i.e., during a period for inputting ineffective pixels, like the first preferred embodiment, thereby ensuring reduction in power consumption and in memory capacity of the FIFO memory.

In the fifth preferred embodiment, the carry-out terminal CO and the carry-out function of the address counter 10A serve as detection means for detecting that the last address has been accessed or control means. The count enable terminal CE and the count enable function of the address counter 10A serve as means for stopping count operation of the address counter 10A which is one example of address specifying means.

<The Sixth Preferred Embodiment>

Figure 18:
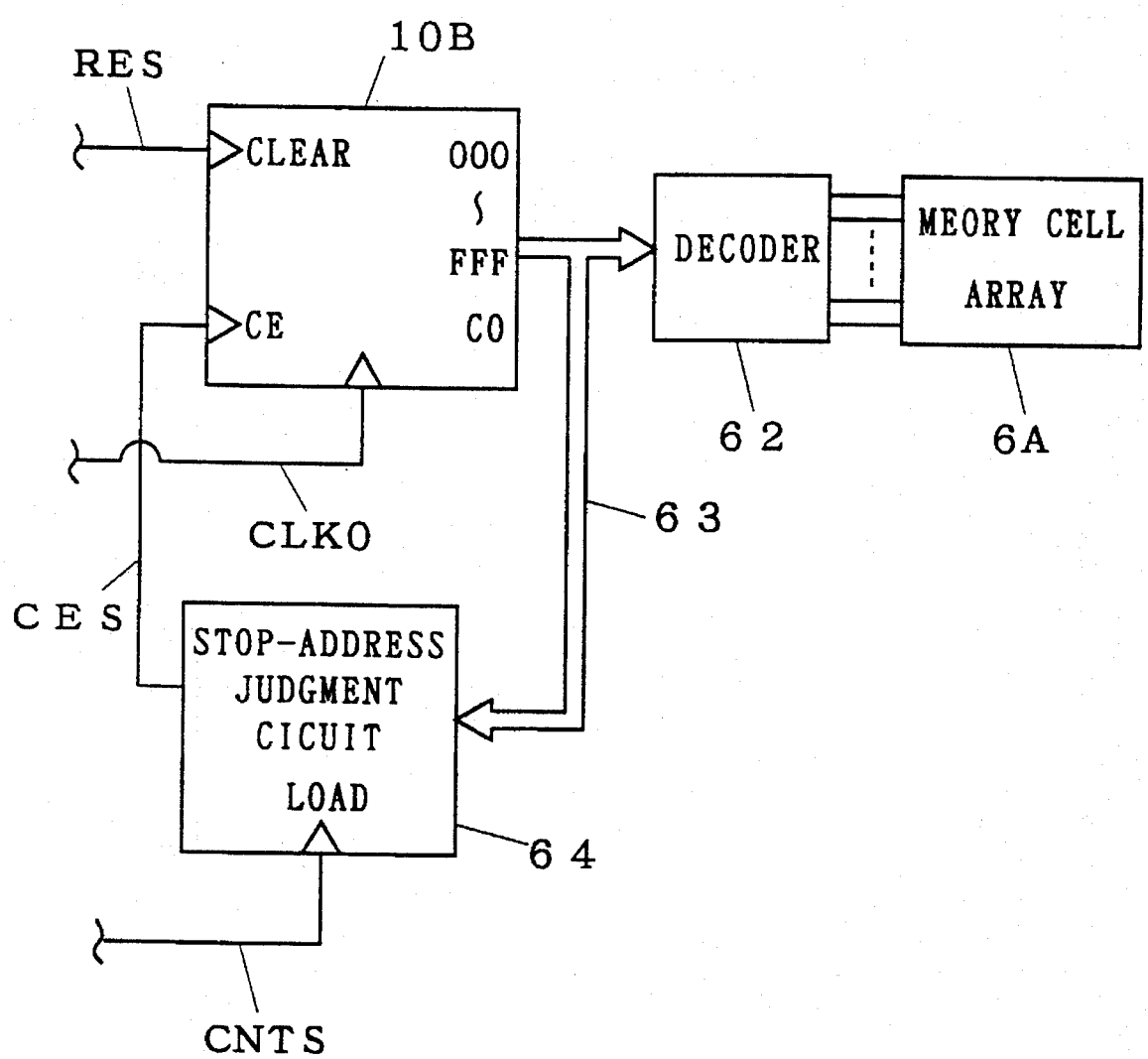
FIG. 18 is a block diagram of a configuration in accordance with a sixth preferred embodiment of the present invention.

The sixth preferred embodiment is a variation of the fifth preferred embodiment, adding the function of the second preferred embodiment to the fifth preferred embodiment. FIG. 18 is a block diagram of a configuration of the sixth preferred embodiment.

In FIG. 18, an address counter 10B has the same function as the address counter 10A of FIG. 17. A stop-address judgment circuit 64 judges whether or not a counter value given by an output signal 63 of the address counter 10B reaches the predetermined number to be counted which is given by a count-value command signal CNTS inputted to the LOAD terminal through comparison, and outputs a count enable signal CES when the counter value reaches the predetermined number. Receiving the count enable signal CES, the address counter 10B is inactivated, thereby stopping its count operation. Therefore, if the predetermined number to be counted is set to a value determined in accordance with the number of effective pixels, a multiword FIFO memory which is capable of dealing with a variety of numbers of effective pixels can be implemented.

As discussed above, according to each preferred embodiment of the present invention, the access to the memory cell array can be stopped at an arbitrary pointer of a wold line specified by the word line pointer or at an arbitrary address value specified by the address counter, and thereby reduction in power consumption and reduction in area (or prevention of increasing the circuit scale) can be achieved.

Furthermore, although discussion has been made in the above preferred embodiments as to a case where video signals are written to or read from the FIFO memory as data signals, the present invention is applicable not only to the image processing art, but also widely to a case where only a certain number of effective data of inputted data signals should be written to or read from the FIFO memory. For example, the present invention can be applied to a data processing with a computer in which the operation speed of the processing unit is slower than that of the input unit. In such meaning, video signals and the number of effective pixels referred to in the preferred embodiments may be grasped as data signals and the number of effective data, respectively.

While the invention has been shown and described in detail, the foregoing description is in all aspects illustrative and not restrictive. It is therefore understood that numerous modifications and variations can be devised without departing the scope of the invention.

We claim:

1. A sequential access memory comprising:

a memory cell array which data signals are written to and read from;

addressing means for receiving a reset signal which is externally given, to specify a word line address and a bit line address to make access to word lines and bit lines of said memory cell array in accordance with a reference clock signal which is externally given and thereby to output an output signal, said output signal specifying a predetermined word line; and control means for detecting that a predetermined address of said predetermined word line has been specified based on said output signal from said addressing means and said reference clock signal to stop an operation of said addressing means in accordance with a detection result, wherein said predetermined address of said predetermined word line is previously determined in accordance with a number of effective data of said data signals which are inputted.

2. The sequential access memory of claim 1, wherein:

said addressing means comprises,
 a clock generator for outputting a word line clock signal and a bit line clock signal in accordance with said reference clock signal after being reset by receiving said reset signal,
 an input/output circuit for controlling the writing and reading of said data signals to and from said memory cell array through said bit lines in response to said bit line clock signal, and
 a word line pointer having a shift register for sequentially specifying each location of said word lines in response to said word line clock signal;

said control means comprises,
 detection means for detecting a timing of writing or reading said data signals to or from said predetermined address of said predetermined word line based on an output from said word line pointer; and
 clock control signal generating means for outputting a clock control signal which gives to said clock generator a command to stop an operation of said clock generator in accordance with a detection result of said detection means; and said clock generator stops its operation of outputting said word line clock signal and said bit line clock signal in response to said clock control signal.

3. The sequential access memory of claim 2, wherein:

said predetermined address of said predetermined word line is a last address of a last word line, and said detection means comprises,
last address access signal generating means for detecting a timing of writing or reading said data signals to or from said last address of said last word line based on an output from said word line pointer which specifies said last word line, and for outputting a detection result as a last address access signal.

4. The sequential access memory of claim 3, wherein, said clock control signal generating means output said clock control signal in response to said last address access signal.

5. The sequential access memory of claim 3, further comprising:

said clock generator comprising a counter for counting said reference clock signal in response to said reset signal; and another clock generator for outputting said word line clock signal and said bit line clock signal in accordance with a number of counts outputted from said counter; and said last address access signal generating means comprising an AND circuit for obtaining a logical product of a carry-out signal outputted from said counter and an output from said word line pointer which specifies said last word line, and for outputting an AND signal which indicates said logical product as said last address access signal; and said counter comprising a count enable input operable to stop a count operation of said counter in response to said last address access signal.

6. The sequential access memory or claim 3, wherein said clock control signal generating means comprises,
a counter for counting said last address access signal to give a command indicating that a count result reaches a predetermined number to be counted; and
a control flag generator for outputting said clock control signal in response to said command, and wherein said predetermined number to be counted is determined in accordance with a number of effective data of said data signals.

7. The sequential access memory of claim 5, wherein said clock control signal generating means further comprises
a selector for selecting a preset load signal which gives said predetermined number to be counted from a plurality of preset load signals each of which gives a number to be counted corresponding to a number of effective data of said data signals, and for outputting said preset load signal which is selected to a preset load terminal of said counter, said counter selects one of a plurality of preset signals applied to preset terminals thereof in accordance with said preset load signal received by said preset load terminal, and each of said plurality of preset signals which correspond to said plurality of preset load signals, respectively, gives a corresponding number of effective data of said data signals.

8. The sequential access memory of claim 6, wherein:

said memory cell array comprises,
n (n≧2) another memory cell arrays serially connected to each other with said word lines in common, each of said n another memory cell arrays having a memory capacity determined by dividing a maximum number of effective data of said data signals by n, for sequentially transmitting said data signals to a next one of said another memory cell arrays; and a selector for receiving a plurality of outputs corresponding to possible numbers of effective data of said data signals among outputs of said n another memory cell arrays, and for selecting one of said plurality of received outputs, which corresponds to a number of effective data of said data signals actually received, to output said selected one.

9. The sequential access memory of claim 2, wherein, said detection means comprises,
a selector for receiving a plurality, of outputs from said word line pointer, and for selecting one of said plurality of received outputs, which indicates said predetermined word line specified by a mode signal to be inputted, to output said selected one, and
predetermined address access signal generating means for detecting that said predetermined address of said predetermined word line has been accessed based on an output of said selector to output a predetermined address access signal, and said clock control signal generating means outputs said clock control signal in response to said predetermined address access signal.

10. The sequential access memory of claim 9, comprising:

said clock generator comprising a counter for counting said reference clock signal in response to said reset signal; and an another clock generator for outputting said word line clock signal and said bit line clock signal in accordance with a number of counts outputted from said counter;

said counter comprising a count enable input operable to stop a count operation of said counter in response to said predetermined address access signal; and said predetermined address access signal generating means outputting said predetermined address access signal in accordance with said carry-out signal outputted from said counter and said output of said selector.

11. The sequential access memory of claim 1, wherein:

said addressing means is an address counter for counting said reference clock signal and specifying addresses of said memory cell array in accordance with a count result, and said address counter stops its count operation in response to an output of said control means and remains in a stopped state until said reset signal is applied thereto.

12. The sequential access memory of claim 11, wherein:

the predetermined address of said predetermined word line is a last address value of a last word line, and said address counter comprises a carry-out output operable to output a carry-out signal as said detection result when the count result of said address counter indicates said last address value of said memory cell array.

13. The sequential access memory of claim 11, wherein:

said control means outputs a signal to give an operation-stop command to a count enable terminal of said address counter when said count result of said address counter is equal to a number to be counted which corresponds to said predetermined address of said predetermined word line.

14. A sequential access memory, comprising:

a memory cell array which data signals are written to and read from;

a counter for counting a reference clock signal which is externally given in response to a reset signal to generate a count number and a first clock signal;

a clock control gate connected to a count output terminal of said counter, for receiving a first output signal to control outputting said count number from said counter in accordance with a level of said first output signal;

a clock generator for receiving said count number of said counter outputted from said clock control gate, and for generating a clock signal to specify bit lines of said memory cell array;

a word line pointer for sequentially specifying word lines of said memory cell array in accordance with said first clock signal;

a word line control gate connected between said word line pointer and said memory cell array, for controlling inputting an output of said word line pointer to said memory cell array in accordance with said level of said first output signal; and first and second output signal generating means for detecting a first timing at which a last address of a last word line is specified by receiving a last line access signal which indicates that said word line pointer has specified said last word line to thereby output a signal which changes from a first level into a second level to said clock control gate and said word line control gate as said first output signal at said first timing, and for detecting a second timing at which the last address of a predetermined word line is specified by receiving a predetermined line access signal which indicates that said word line pointer has specified said predetermined word line after specifying said last word line to thereby output said first output signal which changes from said second level into said first level to said clock control gate and said word line control gate at said second timing, while outputting a second output signal which changes in level at said second timing to said counter as said reset signal.

15. The sequential access memory of claim 14, wherein said counter comprises:

a first selector for changing a preset number in response to a level change of said first output signal; and a preset counter for receiving said preset number outputted from said first selector as an initial value, to count said reference clock signal, and for outputting said count number and said first clock signal, said preset counter being reset in response to said reset signal which is received by a clear terminal thereof.

16. The sequential access memory of claim 15, wherein:

said preset counter comprises a carry-out terminal for outputting a carry-out signal; and said first and second output signal generating means comprises, AND circuit means for detecting said first timing by obtaining a logical product of said carry-out signal and said last line access signal outputted from said word line pointer, while detecting said second timing by obtaining a logical product of said carry-out signal and said predetermined line access signal, a second selector for selecting an output signal of said AND circuit means in response to a level change of said first output signal, first output signal generating means having an output end connected to said first selector, said second selector, said word line control gate and said clock control gate, for outputting said first output signal which changes from said first level into said second level when an output of said second selector indicates that said first timing has been detected, and for outputting said first output signal which changes from said second level into said first level when said output from said second selector indicates that said second timing has been detected; and second output signal generating means having an input end is connected to said output of said second selector and an output of said first output signal generating means, for outputting a level change of said second output signal based on said output from said second selector indicating that said second timing has been detected and said first output signal which changes from said second level into said first level.

17. The sequential access memory of claim 16, wherein, said first output signal generating means comprises, a status latch for outputting said second level as said first output signal when said output of said second selector indicates that said first timing has been detected, while outputting said first level as said first output signal when said output of said second selector indicates that said second timing has been detected.

* * * * *